(12) United States Patent
Brown et al.

(10) Patent No.: US 10,985,936 B2
(45) Date of Patent: Apr. 20, 2021

(54) CUSTOMIZED INTERFACE BASED ON VOCAL INPUT

(71) Applicant: Google LLC, Mountain View, CA (US)

(72) Inventors: Benjamin Brown, San Francisco, CA (US); Christopher Conover, San Francisco, CA (US); Lishan Zhang, Sunnyvale, CA (US); Alexander Crettenand, San Mateo, CA (US); Lantian Zheng, San Jose, CA (US); Mafang Yao, Fremont, CA (US); Minoo Erfani Joorabchi, San Jose, CA (US); Francisco Pedro Lopes Pimenta, Mountain View, CA (US); Rui Zhao, Sunnyvale, CA (US); Yuzhao Ni, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 44 days.

(21) Appl. No.: 16/154,512

(22) Filed: Oct. 8, 2018

(65) Prior Publication Data
US 2020/0112454 A1   Apr. 9, 2020

(51) Int. Cl.
*H04L 12/28* (2006.01)
*G06F 3/16* (2006.01)
*G10L 17/22* (2013.01)

(52) U.S. Cl.
CPC .......... *H04L 12/2814* (2013.01); *G06F 3/167* (2013.01); *G10L 17/22* (2013.01); *H04L 12/282* (2013.01); *H04L 12/2809* (2013.01); *H04L 2012/2847* (2013.01)

(58) Field of Classification Search
CPC ............ H04L 12/2814; H04L 12/2809; H04L 12/282; H04L 2012/2847; H04L 12/2816; G06F 3/167; G10L 17/22
See application file for complete search history.

(56) References Cited

U.S. PATENT DOCUMENTS

| 10,091,015 | B2 | 10/2018 | Kennedy | |
|---|---|---|---|---|
| 2012/0023157 | A1 | 1/2012 | Roth et al. | |
| 2012/0310386 | A1 | 12/2012 | To | |
| 2014/0098247 | A1* | 4/2014 | Rao | H04W 4/20 348/207.1 |
| 2014/0176314 | A1* | 6/2014 | Hoyos | G08C 17/02 340/12.52 |
| 2015/0222517 | A1* | 8/2015 | McLaughlin | H04L 63/0435 713/156 |

(Continued)

OTHER PUBLICATIONS

Extended European Search Report dated Oct. 14, 2019 in European Patent Application No. 19185111.2, all pages.

(Continued)

*Primary Examiner* — Javier O Guzman
(74) *Attorney, Agent, or Firm* — Kilpatrick Townsend & Stockton LLP

(57) ABSTRACT

Various arrangements for using captured voice to generate a custom interface controller are presented. A vocal recording from a user may be captured in which a spoken command and multiple smart-home devices are indicated. One or more common functions that map to the multiple smart-home devices may be determined. A custom interface controller may be generated that controls the one or more common functions of each smart-home device of the multiple smart-home devices.

17 Claims, 15 Drawing Sheets

(56) References Cited

U.S. PATENT DOCUMENTS

| | | | |
|---|---|---|---|
| 2015/0341227 A1* | 11/2015 | Tatzel | G06F 3/14 715/736 |
| 2016/0241660 A1* | 8/2016 | Nhu | H04L 67/26 |
| 2016/0261425 A1* | 9/2016 | Horton | G05D 23/1917 |
| 2016/0316007 A1* | 10/2016 | Hou | H04L 67/1053 |
| 2016/0330042 A1* | 11/2016 | Andersen | H04L 12/282 |
| 2017/0076523 A1* | 3/2017 | Rumble | G06Q 20/127 |
| 2017/0357425 A1* | 12/2017 | Smith | G05B 15/02 |
| 2018/0087795 A1 | 3/2018 | Okita et al. | |
| 2018/0108351 A1 | 4/2018 | Beckhardt et al. | |
| 2018/0123818 A1* | 5/2018 | Shinar | H04L 12/282 |
| 2018/0213077 A1* | 7/2018 | Zheng | G06F 3/0482 |
| 2018/0301148 A1* | 10/2018 | Roman | G06F 3/167 |
| 2018/0357847 A1* | 12/2018 | Shinar | H04L 67/12 |
| 2019/0019504 A1* | 1/2019 | Hatambeiki | G10L 15/20 |
| 2019/0311721 A1* | 10/2019 | Edwards | G10L 17/06 |
| 2020/0090068 A1* | 3/2020 | Brett | G06N 5/047 |

OTHER PUBLICATIONS

Extended European Search Report dated Jan. 29, 2020, in European Patent Application No. 19185241.7, 12 pages.

Non-Final Office Action dated Feb. 14, 2020 in U.S. Appl. No. 16/154,466, 16 pages.

* cited by examiner

CUSTOMIZED INTERFACE BASED ON VOCAL INPUT

CROSS-REFERENCES TO RELATED APPLICATIONS

This application is related U.S. patent application Ser. No. 16/154,466, filed Oct. 8, 2018, entitled "Multi-Source Smart-Home Device Control," the entire disclosure of which is hereby incorporated by reference for all purposes.

BACKGROUND

Smart-home devices, such as smart outlets, smart lights, smart speakers, home assistant devices, smart thermostats, and smart hazard detectors are becoming common in homes worldwide. Effectively allowing a single controller device to control various smart-home devices that having varying capabilities and that receive commands from different cloud-based server systems can result in significant technical challenges.

SUMMARY

Various embodiments are described related to a method for using captured voice to generate a custom interface controller. In some embodiments, a method for using captured voice to generate a custom interface controller is described. The method may include capturing, via a mobile device, a vocal recording from a user. The vocal recording may include a spoken command directed to a plurality of smart-home devices. The method may include transmitting the vocal recording to a cloud-based server system. The method may include receiving, by an application executed by the mobile device, a response from the cloud-based server system that may include a plurality of smart-home device identifiers. The spoken command may be implemented at the plurality of smart-home devices mapped to the plurality of smart-home device identifiers. The method may include determining, by the application executed by the mobile device, one or more common functions that may map to the plurality of smart-home devices based on the plurality of smart-home device identifiers. The method may include generating, by the application executed by the mobile device, the custom interface controller that may control the one or more common functions of each smart-home device of the plurality of smart-home devices.

Embodiments of such a method may include one or more of the following features: The method may include receiving, by the application executed by the mobile device, user input via the custom interface controller and a touchscreen of the mobile device. The method may include determining, by the application executed by the mobile device, a command to be performed by each of the plurality of smart-home devices based on the user input received via the custom interface controller. The method may include transmitting, by the application executed by the mobile device, the command and the plurality of smart-home device identifiers to the cloud-based server system. The method may include, in response to receiving the command and the plurality of smart-home device identifiers from the application executed by the mobile device, transmitting, to a second cloud-based server system, an indication of the command and a smart-home device identifier of the plurality of smart-home device identifiers. The second cloud-based server system may communicate with a second smart-home device mapped to the smart-home device identifier. The method may include, in response to receiving the command and the plurality of smart-home device identifiers from the application executed by the mobile device, transmitting, a second indication of the command to a second smart-home device mapped to a second smart-home device identifier of the plurality of smart-home device identifiers. The custom interface controller may include a first control to control a first function of the plurality of smart-home devices and a second control to control a second function of the plurality of smart-home devices. The custom controller may include a first control to control a first function of the plurality of smart-home devices and a second control to control a second function of a subset of the plurality of smart-home devices. The vocal recording additionally may indicate a location and a type of smart-home device. The cloud-based server system may cause the spoken command to be performed at the plurality of smart-home devices based on the plurality of smart-home devices matching the location and the type of smart-home device indicated in the vocal recording. The method may include analyzing, by the cloud-based server system, the vocal recording to determine the spoken command and the plurality of smart-home devices.

In some embodiments, a system for using captured voice to generate a custom interface controller is described. The system may include a smart-home application executed by a mobile device that causes the mobile device to capture, via one or more microphones, a vocal recording from a user. The vocal recording may include a spoken command directed to a plurality of smart-home devices. The device may transmit, via a network interface of the mobile device, the vocal recording to a cloud-based host server system. The device may receive a response from the cloud-based host server system that may include a plurality of smart-home device identifiers. The spoken command may be implemented at the plurality of smart-home devices mapped to the plurality of smart-home device identifiers. The device may determine one or more common functions that map to the plurality of smart-home devices based on the plurality of smart-home device identifiers. The device may generate the custom interface controller for presentation by a display of the mobile device. The custom interface controller may control the one or more common functions of each smart-home device of the plurality of smart-home devices.

Embodiments of such a system may include one or more of the following features: The smart-home application may further cause the mobile device to receive, via a touchscreen of the mobile device, user input via the custom interface controller. The touchscreen may include the display. The smart-home application may further cause the mobile device to determine a command to be performed by each of the plurality of smart-home devices based on the user input received via the custom interface controller and transmit the command and the plurality of smart-home device identifiers to the cloud-based host server system. The smart-home application may further cause the mobile device to transmit, to a cloud-based server system, an indication of the command and a smart-home device identifier of the plurality of smart-home device identifiers in response to receiving the command and the plurality of smart-home device identifiers from the smart-home application executed by the mobile device. The cloud-based server system may communicate with a second smart-home device mapped to the smart-home device identifier. The smart-home application may further cause the mobile device to transmit a second indication of the command to a second smart-home device mapped to a second smart-home device identifier of the plurality of smart-home device identifiers in response to receiving the command and the plurality of smart-home device identifiers from the smart-home application executed by the mobile device. The custom interface controller may include a first control to control a first function of the plurality of smart-home devices and a second control to control a second function of the plurality of smart-home devices. The custom controller may include a first control to control a first function of the plurality of smart-home devices and a second control to control a second function of a subset of the plurality of smart-home devices. The vocal recording additionally may indicate a location and a type of smart-home device. The cloud-based server may cause the spoken command to be performed at the plurality of smart-home devices based on the plurality of smart-home devices matching the location and the type of smart-home device indicated in the vocal recording. The system may include the cloud-based host server system that may be configured to analyze the vocal recording to determine the spoken command and the plurality of smart-home devices.

In some embodiments, a system for using captured voice to generate a custom interface controller is described. The system may include a cloud-based host server system. The system may include a mobile device. One or more processors of the cloud-based host server system and the mobile device may be configured to capture, via one or more microphones, a vocal recording from a user. The vocal recording may include a spoken command directed to a plurality of smart-home devices. The system may determine one or more common functions of the plurality of smart-home devices. The system may generate the custom interface controller for presentation by a display of the mobile device. The custom interface controller may control the one or more common functions of each smart-home device of the plurality of smart-home devices.

Embodiments of such a system may include one or more of the following features: The one or more processors may be further configured to receive user input via the custom interface controller. The one or more processors may be further configured to determine a command to be performed by each of the plurality of smart-home devices based on the user input received via the custom interface controller. The one or more processors may be further configured to, based on the command, cause an indication of the command and a smart-home device identifier to be transmitted to a cloud-based server system distinct from the cloud-based host server system. The cloud-based server system may communicate with a second smart-home device mapped to the smart-home device identifier.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
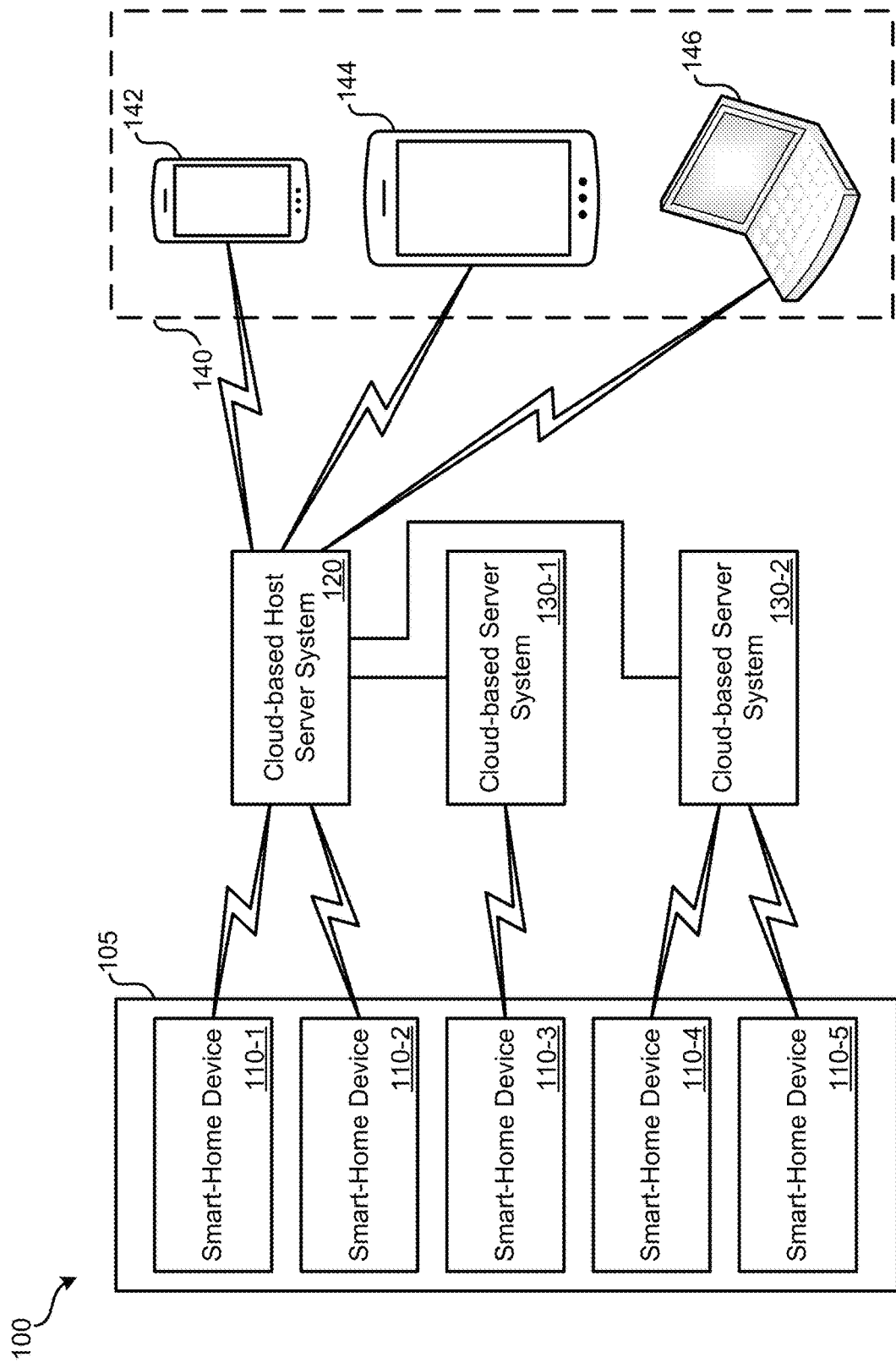
FIG. 1 illustrates a block diagram of an embodiment of a smart-home system.

Smart-home devices may be controlled using a smart-home controller device. A smart-home controller device may be a wireless or mobile computerized device, such as a smartphone, tablet computer, laptop computer, dedicated home-controller device, or some other form of computerized device, that may execute an application that allows a user to control the functionality of one or more smart-home devices. The smart-home controller device may communicate with a cloud-based host server system. The cloud-based host system may communicate with various smart-home devices and may communicate with other cloud-based system to control smart-home devices that cannot be directly controlled by the cloud-based host system (e.g., smart devices manufactured and sold by other manufacturers).

The smart-home controller device may provide an interface that allows for smart-home devices to be controlled together and/or using a single input regardless of whether each smart-home device is controlled by the cloud-based host system or through another cloud-based system. The smart-home controller device may allow for smart-devices to be grouped based on location and/or function. Within such an arrangement, a common control element may be provided that allows a user to provide a single input that indicates a command that is to be implemented at multiple smart-home devices, regardless of whether the smart-home devices are controlled directly by the cloud-based host server system and/or through a separate cloud-based server system.

The smart-home controller device may additionally be configured to reclassify various types of smart-home devices based on user behavior. Such a reclassification may allow the smart-home controller device to determine when to send a command to a smart-home device more accurately and effectively. When a smart-home device is initially registered with the smart-home controller device or the registration is edited, a user may name the smart-home device and/or identify characteristics of the smart-home device. The words (and/or parts of words) submitted as part of the name may be compared to a smart-home device function database. The use of a particular word, part of a word, or phrase within a name of a smart-home device may be indicative of the smart-home device being used to perform a particular function. As an example, a smart outlet plug, if given the name of "dining room light" by a user, the smart outlet plug can be expected to control whether power is provided to a light located within the dining room. The smart-home controller device may classify the smart outlet plug in a lighting group (e.g., a dining room lighting group) because while the smart device is a smart outlet plug, it is effectively functioning as a controller for a light. Thus, if a user provides a command that indicates all of the lights within the dining room should be turned on or off, the smart-home controller device or cloud-based host server system may send the command to the smart outlet plug since it controls a light.

Additionally or alternatively, voice-based commands may be provided by a user to the smart-home controller device to control the functionality of multiple smart-home devices. The user may speak a command that does not correspond to a particular smart-home device or a predefined group of smart-home devices. For example, a user may say "turn on the dining room lights and the kitchen fan" or "turn off the dining room and the living room lights." Embodiments detailed herein detail how a custom controller may be generated that controls at least one common function across all of the smart-home devices indicated in the spoken command. This interactive custom controller may allow a user to further change the state of the multiple smart-home devices that were the subject of the initial spoken command. The custom controller may include a graphical representation of a power button that, referring to the first example, controls both the dining room lights and the kitchen fan or, referring to the second example, all of the smart lights in the dining room and the living room. This custom controller may present some or all of the functions that all of the smart-home devices that were indicated in the spoken command have in common. Additionally or alternatively, the custom controller may present one or more functions that can only be performed at some of the smart-home devices indicated in the spoken command. For example, referring back to the example of the dining room lights and the kitchen fan, the custom controller may include a dimmer control that does not affect the state of the fan but allows at least a subset of the lights in the dining room to be dimmed via additional user input.

Further detail regarding the above embodiments and additional embodiments is provided in relation to the figures. While the following description is focused on smart-home devices, it should be understood that other forms of smart-devices may be controlled as detailed other than smart-home devices. For instance, smart devices in a factory, office, deployed in the field, or some other form of smart devices may be controlled as detailed herein. FIG. 1 illustrates a block diagram of an embodiment of a smart-home system 100. Smart-home system 100 may include smart-home devices 110 (110-1, 110-2, 110-3, 110-4, 110-5); cloud-based host server system 120; cloud-based server systems 130 (130-1, 130-2); and smart-home controller devices 140.

Smart-home devices 110 represent various smart-home devices that may be present in a particular structure 105 (e.g., a home, an apartment, a condominium, an office, a warehouse, a factory, etc.). Smart-home devices 110 may have differing sensors on-board and may or may not have the ability to output information (e.g., via sound, light, or an electronic display). Specific forms of smart-home devices 110 are detailed in relation to FIG. 2. In the illustrated embodiment of system 100, five smart-home devices 110 are presented. This number of smart-home devices is for example purposes only; in other embodiments, fewer or greater numbers of smart-home devices may be present within or at structure 105. Each of smart-home devices 110 may be able to perform some form of function in response to a command received from an associated form of cloud-based server system (120, 130). For example, possible commands may be instructions to turn on, turn off, dim, lock, unlock, play, pause, stop, turn the volume up, turn the volume down, mute, hush, turn the temperature up, turn the temperature down, etc.

Smart-home devices 110 may have been acquired from varying sources. For example, a first entity (e.g., manufacturer) may produce smart-home devices 110-1 and 110-2, a second entity may produce smart-home device 110-3, and a third entity may produce smart-home devices 110-4 and 110-5. Such an arrangement in which smart-home devices from multiple entities is present within structure 105 may be fairly common: while a user may desire the feature set of one type of smart-home device, for another type of smart-home device, another entity may provide benefits that the user prefers.

Each smart-home device of smart-home devices 110 may communicate with a form of a cloud-based server system (120, 130). That is, each entity that provides smart-home devices may operate or have operated on its behalf a cloud-based server system that can receive data from its associated smart-home devices and send data (e.g., commands) to its associated smart-home devices. Cloud-based host server system 120 may communicate directly with smart-home devices 110-1 and 110-2. In this description, "directly" refers to the a server system communicating with a smart-home device via one or more networks without any additional intervening smart-home server systems. For example, the communication between smart-home device 110-1 and cloud-based host server system 120 may occur via a local wireless network (WLAN) provided by a router within structure 105. The router may be connected to an Internet service provider (ISP) that provides a wired or wireless communication link to the Internet. Cloud-based host server system 120 may be connected with the Internet, thus allowing data to be passed between smart-home device 110-1 and cloud-based host server system 120.

For other entities, separate cloud-based server systems may control associated smart-home devices: smart-home device 110-3 communicates directly with cloud-based server system 130-1 and smart-home devices 110-4 and 110-5 communicate directly with cloud-based server system 130-2. Cloud-based host server system 120 can additionally communicate with other cloud-based server systems 130 through one or more application programming interfaces (APIs). Therefore, cloud-based host server system 120 can receive data from and control smart-home devices 110-3 through 110-5, albeit not directly because communication via cloud-based server systems 130-1 and 130-2 is used. Further detail regarding cloud-based host server system 120 is provided in relation to FIG. 3.

Smart-home controller devices 140 may serve as an interface for one or more users to interact with cloud-based host server system 120 to receive data from and control smart-home devices 110. Some or all of smart-home controller devices 140 may each receive auditory commands in the form of speech spoken by a user. Further, each of smart-home controller devices 140 may have a display or touchscreen that allows graphical user interfaces (GUIs) to be presented to the users. Smart-home controller devices 140 can include: smartphone 142; tablet computer 144; and laptop computer 146. Other forms of smart-home controller devices 140 may be possible, such as a dedicated smart-home device controller computerized device, a desktop computer, or a gaming device. Further detail regarding a smart-home controller device is provided in relation to FIG. 4.

Figure 2:
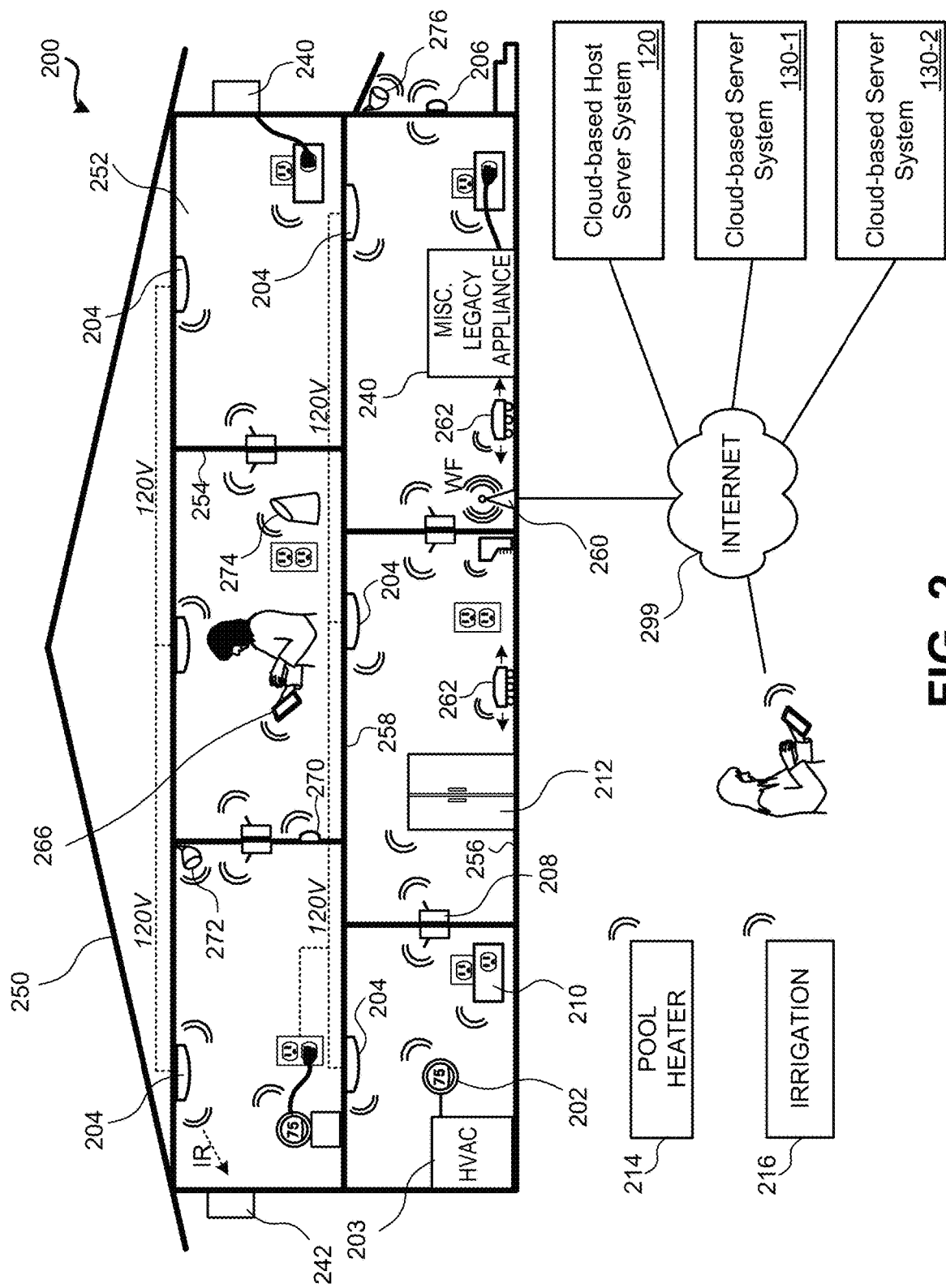
FIG. 2 illustrates an embodiment of a smart-home with additional detail regarding smart-home devices.

FIG. 2 illustrates an embodiment of a smart-home environment 200 with additional detail regarding smart-home devices. Smart-home 200 represents an embodiment of structure 105 that includes multiple smart-home devices. The depicted smart-home environment 200 includes a structure 250, which can include, e.g., a house, office building, garage, or mobile home. It will be appreciated that devices can also be integrated into a smart-home environment 200 that does not include an entire structure 250, such as an apartment, condominium, or office space. Further, the smart-home environment can control and/or be coupled to devices outside of the actual structure 250. Indeed, several devices in the smart-home environment need not physically be within the structure 250 at all. For example, a device controlling a pool heater 214 or irrigation monitor 216 can be located outside of the structure 250.

The depicted structure 250 includes a plurality of rooms 252, separated at least partly from each other via walls 254. The walls 254 can include interior walls or exterior walls. Each room can further include a floor 256 and a ceiling 258. Devices can be mounted on, integrated with and/or supported by a wall 254, floor 256 or ceiling 258.

In some embodiments, the smart-home environment 200 of FIG. 2 includes a plurality of smart-home devices, including intelligent, multi-sensing, network-connected devices, that can integrate seamlessly with each other and/or with a central server or a cloud-computing system to provide any of a variety of useful smart-home objectives. The smart-home environment 200 may include one or more intelligent, multi-sensing, network-connected thermostats 202 (hereinafter referred to as "smart thermostats 202"), one or more intelligent, network-connected, hazard detectors 204, and one or more intelligent, multi-sensing, network-connected entryway interface devices 206 (hereinafter referred to as "smart doorbells 206"). According to embodiments, the smart thermostat 202 detects ambient climate characteristics (e.g., temperature and/or humidity) and controls a HVAC system 203 accordingly. The hazard detector 204 may detect the presence of a hazardous substance or a substance indicative of a hazardous substance (e.g., smoke, fire, or carbon monoxide). The smart doorbell 206 may detect a person's approach to or departure from a location (e.g., an outer door), control doorbell functionality, announce a person's approach or departure via audio or visual means, or control settings on a security system (e.g., to activate or deactivate the security system when occupants go and come).

In some embodiments, the smart-home environment 200 of FIG. 2 further includes one or more intelligent, multi-sensing, network-connected wall switches 208 (hereinafter referred to as "smart wall switches 208"), and/or with one or more intelligent, multi-sensing, network-connected outlet interfaces 210 (hereinafter referred to as "smart wall plugs 210" or "smart outlets"). The smart wall switches 208 may detect ambient lighting conditions, detect room-occupancy states, and control a power and/or dim state of one or more lights. In some instances, smart wall switches 208 may also control a power state or speed of a fan, such as a ceiling fan. The smart wall plugs 210 (or smart outlet plugs) may detect occupancy of a room or enclosure and control supply of power to one or more wall plugs (e.g., such that power is not supplied to the plug if nobody is at home). Further, such smart wall plugs or smart outlet plugs may turn on or off electricity to a connected device based on a command received from an associated cloud-based server system (e.g., 120, 130-1, 130-2).

In some embodiments, one or more smart indoor security cameras may be present such as indoor security camera 272. Indoor security camera 272 may wirelessly communicate with a cloud server system to capture and record video and audio. Indoor security camera 272 may be able to detect motion, recognize a resident (e.g., via facial detection), and detect the presence of a resident or other person via audio (e.g., detection of a human voice). Indoor and outdoor security cameras may be used to determine when a resident leaves home (for example, an OBM behavior may be a time range during the day when a resident typically leaves home, such as between 8 AM and 6 PM) or returns home. In some embodiments, as previously detailed, this data may be supplemented with location data derived from an electronic device, such as a smartphone, that a resident typically carries when going out. If the smartphone is forgotten by the resident, data from the cameras may be used to determine that the smartphone has been left behind and the resident has left the residence (e.g., a camera detects the resident leaving, the smartphone remains stationary in the residence, and there is no movement detected within the residence for a threshold period of time). When the environment is darkened, indoor security camera 272 may use infrared to detect the presence of a resident and/or other persons in the camera's field-of-view.

In some embodiments, one or more smart outdoor security cameras may be present such as outdoor security camera 276. Outdoor security camera 276 may wirelessly communicate with a cloud server system to capture and record video and audio and may function similarly to indoor security camera 272. Outdoor security camera 276 may include weatherproofing to protect against the outdoor environment. Outdoor security camera 276 may be able to detect motion, recognize a resident (e.g., via facial detection), and detect the presence of a resident or other person via audio (e.g., detection of a human voice). At night, outdoor security camera 276 may use infrared to detect the presence of a resident and/or other persons in the camera's field-of-view.

In some embodiments, one or more home assistant devices may be present in the residence, such as home assistant device 274. Home assistant device 274 may include one or more microphones. Home assistant device 274 may detect and analyze human speech and may be able to detect speech and/or movement by the resident. Clips of captured human speech may be provided to cloud-based host server system 120 for analysis. A response may be provide to home assistant device 274, which may output the response in the form of spoken audio. Cloud-based host server system 120 may cause one or more other smart-home devices in home environment 200 to perform a function based on a command identified from the received human speech.

Still further, in some embodiments, the smart-home environment 200 of FIG. 2 includes a plurality of intelligent, multi-sensing, network-connected appliances 212 (hereinafter referred to as "smart appliances 212"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 212 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart-home can be facilitated by any wired or wireless communication protocols known by those having ordinary skill in the art. The smart-home also can include a variety of non-communicating legacy appliances 240, such as old conventional washer/dryers, refrigerators, lights, and the like which can be controlled, albeit coarsely (ON/OFF), by virtue of the smart wall plugs 210. The smart-home environment 200 can further include a variety of partially communicating legacy appliances 242, such as infrared ("IR") controlled wall air conditioners or other IR-controlled devices, which can be controlled by IR signals provided by the hazard detectors 204 or the smart wall switches 208.

According to embodiments, the smart thermostats 202, the hazard detectors 204, the smart doorbells 206, the smart wall switches 208, the smart wall plugs 210, and other devices of the smart-home environment 200 are modular and can be incorporated into older and new houses. For example, the devices are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

The smart-home environment 200 may also include communication with devices outside of the physical home but within a proximate geographical range of the home. For example, the smart-home environment 200 may include a pool heater monitor 214 that communicates a current pool temperature to other devices within the smart-home environment 200 or receives commands for controlling the pool temperature. Similarly, the smart-home environment 200 may include an irrigation monitor 216 that communicates information regarding irrigation systems within the smart-home environment 200 and/or receives control information for controlling such irrigation systems. According to embodiments, an algorithm is provided for considering the geographic location of the smart-home environment 200, such as based on the zip code or geographic coordinates of the home. The geographic information is then used to obtain data helpful for determining optimal times for watering; such data may include sun location information, temperature, due point, soil type of the land on which the home is located, etc.

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device 266 (e.g., a smartphone). A webpage or app can be configured to receive communications from the user and control the device based on the communications and/or to present information about the device's operation to the user. For example, the user can view a current setpoint temperature for a device and adjust it, using a computer. The user can be in the structure during this remote communication or outside the structure.

As discussed, users can control and interact with the smart thermostat, hazard detectors 204, and other smart devices in the smart-home environment 200 using a network-connected computer or portable electronic device 266. In some examples, some or all of the occupants (e.g., individuals who live in the home) can register their electronic device 266 with the smart-home environment 200. Such registration can be made at cloud-based host server system 120 (or whichever cloud-based server system is associated with the entity that provided the smart-home devices to be controlled) to authenticate the occupant and/or the device as being associated with the home and to give permission to the occupant to use the device to control the smart devices in the home. An occupant can use their registered electronic device 266 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that, instead of or in addition to registering electronic devices 266, the smart-home environment 200 makes inferences about which individuals live in the home and are therefore occupants and which electronic devices 266 are associated with those individuals. As such, the smart-home environment "learns" who is an occupant and permits the electronic devices 266 associated with those individuals to control the smart devices of the home.

In some embodiments, in addition to containing processing and sensing capabilities, each of the devices 202, 204, 206, 208, 210, 212, 214, and 216 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.)

According to embodiments, all or some of the smart devices can serve as wireless or wired repeaters. For example, a first one of the smart devices can communicate with a second one of the smart devices via a wireless router 260. The smart devices can further communicate with each other via a connection to a network, such as the Internet 299. Through the Internet 299, the smart devices can communicate with a cloud-computing system 264, which can include one or more centralized or distributed server systems. The cloud-computing system 264 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from cloud-computing system 264 to devices (e.g., when available, when purchased, or at routine intervals).

According to embodiments, the smart devices combine to create a mesh network of spokesman and low-power nodes in the smart-home environment 200, where some of the smart devices are "spokesman" nodes and others are "low-powered" nodes. Some of the smart devices in the smart-home environment 200 are battery powered, while others have a regular and reliable power source, such as by connecting to wiring (e.g., to 120V line voltage wires) behind the walls 254 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 200 as well as with the cloud-computing system 264. On the other hand, the devices that are battery powered are referred to as "low-power" nodes. These nodes tend to be smaller than spokesman nodes and can only communicate using wireless protocols that require very little power, such as Zigbee, 6LoWPAN, etc. Further, some, but not all, low-power nodes are incapable of bidirectional communication. These low-power nodes send messages, but they are unable to "listen". Thus, other devices in the smart-home environment 200, such as the spokesman nodes, cannot send information to these low-power nodes.

As described, the smart devices serve as low-power and spokesman nodes to create a mesh network in the smart-home environment 200. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 200. The spokesman nodes in the smart-home environment 200 are able to "drop down" to low-powered communication protocols to receive these messages, translate the messages to other communication protocols, and send the translated messages to other spokesman nodes and/or cloud-computing system 264. Thus, the low-powered nodes using low-power communication protocols are able to send messages across the entire smart-home environment 200 as well as over the Internet 263 to cloud-computing system 264. According to embodiments, the mesh network enables cloud-computing system 264 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening." Accordingly, users, other devices, and cloud-computing system 264 can communicate controls to the low-powered nodes. For example, a user can use the portable electronic device 266 (e.g., a smartphone) to send commands over the Internet to cloud-computing system 264, which then relays the commands to the spokesman nodes in the smart-home environment 200. The spokesman nodes drop down to a low-power protocol to communicate the commands to the low-power nodes throughout the smart-home environment, as well as to other spokesman nodes that did not receive the commands directly from the cloud-computing system 264.

An example of a low-power node is a smart nightlight 270. In addition to housing a light source, the smart nightlight 270 houses an occupancy sensor, such as an ultrasonic or passive IR sensor, and an ambient light sensor, such as a photoresistor or a single-pixel sensor that measures light in the room. In some embodiments, the smart nightlight 270 is configured to activate the light source when its ambient light sensor detects that the room is dark and when its occupancy sensor detects that someone is in the room. In other embodiments, the smart nightlight 270 is simply configured to activate the light source when its ambient light sensor detects that the room is dark. Further, according to embodiments, the smart nightlight 270 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 200 as well as over the Internet 299 to cloud-computing system 264.

Other examples of low-powered nodes include battery-operated versions of the hazard detectors 204. These hazard detectors 204 are often located in an area without access to constant and reliable (e.g., structural) power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, hazard detectors 204 can send messages that correspond to each of the respective sensors to the other devices and cloud-computing system 264, such as by using the mesh network as described above.

Examples of spokesman nodes include smart doorbells 206, smart thermostats 202, smart wall switches 208, and smart wall plugs 210. These devices 202, 206, 208, and 210 are often located near and connected to a reliable power source, and therefore can include more power-consuming components, such as one or more communication chips capable of bidirectional communication in any variety of protocols.

Further included and illustrated in the exemplary smart-home environment 200 of FIG. 2 are service robots 262 each configured to carry out, in an autonomous manner, any of a variety of household tasks. For some embodiments, the service robots 262 can be respectively configured to perform floor sweeping, floor washing, etc. Tasks such as floor sweeping and floor washing can be considered as "away" or "while-away" tasks for purposes of the instant description, as it is generally more desirable for these tasks to be performed when the occupants are not present. For other embodiments, one or more of the service robots 262 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

As noted in relation to FIG. 1, not all of the above detailed smart-home devices may be associated with a same manufacturer or entity that provides service for the smart-home device. Therefore, the smart-home devices in smart-home environment 200 may be controlled using different cloud-based server systems. For example, smart-home devices made by a first manufacturer may be controlled via cloud-based host server system 120, while smart-home devices made by a second manufacturer may be controlled via cloud-based server system 130-1 and smart-home devices made by a third manufacturer may be controlled via cloud-based server system 130-2. By way of example, three cloud-based server systems, including cloud-based host server system is illustrated in FIG. 2; in other embodiments, a greater or fewer number of cloud-based server systems may be present.

Figure 3:
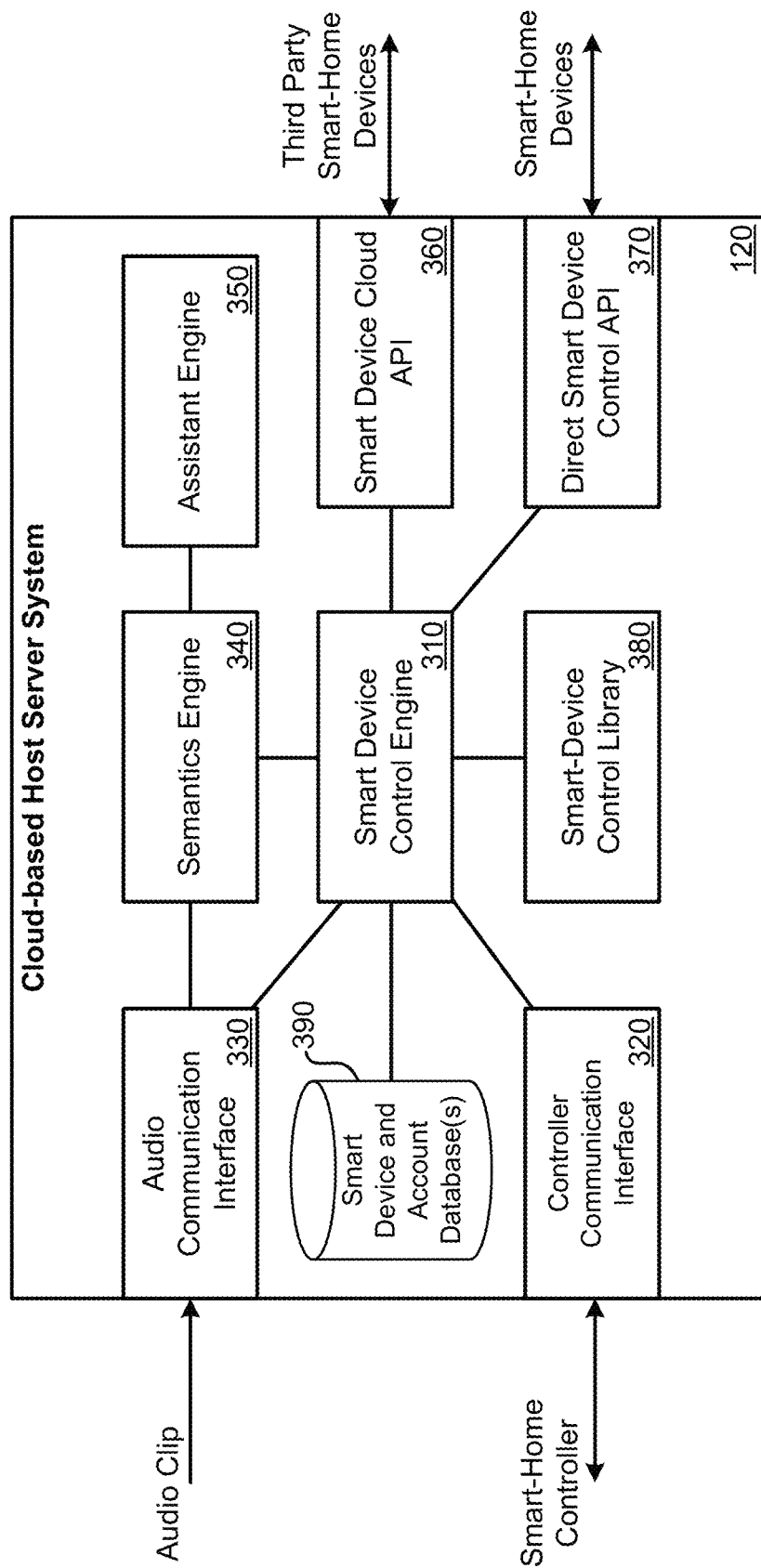
FIG. 3 illustrates a block diagram of an embodiment of a cloud-based host server system.

FIG. 3 illustrates a block diagram of an embodiment of a cloud-based host server system 120. Cloud-based host server system 120 may communicate directly with various smart-home devices, may interface with other cloud-based server systems (to communicate indirectly with smart-home devices provided by third-party manufacturers), and/or may analyze recorded voice samples received from smart-home devices. Cloud-based host server system 120 may include one or more computer server systems that include components such as network interfaces, processors, communication buses, non-transitory computer readable storage mediums, memories, etc. Various components illustrated as part of cloud-based host server system may be performed using dedicated special-purpose hardware, firmware, or general-purpose hardware executing special-purpose software. It should be understood that the various components of cloud-based host server system 120 may be broken out into a greater number of components or combined into a fewer number of components in different embodiments. Cloud-based host server system 120 may include: smart device control engine 310; controller communication interface 320; audio communication interface 330; semantics engine 340; assistant engine 350; smart device cloud API 360; direct smart-device control API 370; smart-device control library 380; and one or more smart device and account databases 390.

Direct smart device control API 370 may be used to communicate directly with various smart-home devices. The smart devices controlled via direct smart device control API 370 may be manufactured or otherwise distributed by a same entity that operates or has cloud-based host server system 120 operated on its behalf. Through direct smart device control API 370, data from various smart-home devices may be received and commands may be transmitted to such smart-home devices. Direct smart device control API 370 may format commands appropriately for communication to smart devices and may format received data appropriately for analysis by smart device control engine 310. In contrast, smart device cloud API 360 may be used to communicate with various smart-home devices through other cloud-based server systems. The smart devices controlled via smart device cloud API 370 may be manufactured or otherwise distributed by a different entity than the entity that operates or has cloud-based host server system 120 operated on its behalf. Through smart device cloud API 360, data from various third-party smart-home devices may be received and commands may be transmitted to such third-party smart-home devices. Smart device cloud API 360 may format commands appropriately for communication to smart devices and may format received data appropriately for analysis by smart device control engine 310. Therefore, smart device cloud API 360 may have access to a library of command types and data types available for each third-party smart device.

Controller communication interface 320 may communicate with various smart-home controller devices. Through controller communication interface 320, requests for a command to be executed by one or more smart-home devices may be received. In some situations, the command may be intended to be executed by one or more smart-home devices directly communicated with by cloud-based host server system 120 via direct smart device control API 370 and one or more smart devices indirectly communicated with via smart device cloud API 360. Controller communication interface 320 may also be used by smart device control engine 310 to send information about data received from smart devices that communicate with cloud-based host server system 120 via smart device cloud API 360 and direct smart device control API 370.

Smart device control library 380 may be a library of the various functions that can be performed using smart devices that are directly communicated with via direct smart device control API 370. When a type of smart device is registered with cloud-based host server system 120, smart device control library 380 may be accessed to determine the particular functions which the smart device can perform and the particular commands available to be transmitted to smart-device control library 380.

Smart device and account databases 390 may serve to store indications of smart-home devices that have been registered with cloud-based host server system 120 with a particular user account. Requests to control a smart-home device received via controller communication interface 320 may be required to be linked with the same user account as indicated in smart device an account databases 390 for security purposes. Therefore, a user may only have permission to control the smart-home devices that have been linked to the user's account. In some embodiments, a user name and password is required to access the user account. In other embodiments, additional security measures may be taken, such as biometrics or two-factor identification. One or more smart device an account databases 390 may also store indications of third-party smart-home devices that have been registered with cloud-based host server system 120.

Audio communication interface 330 may serve to receive an audio clip captured by a smart-home controller, home assistant device, or some other smart-home device through which a user can submit a spoken command. Semantics engine 340 may perform natural language processing to determine what the user said, possibly including: a command; and the device for which the command is intended. Synthesized voice responses may be provided in response to the user via audio communication interface 330.

Vocal or spoken commands that are not directed to smart-home devices may be processed by assistant engine 350. For example, such spoken commands may be requesting data from some other source, such as the Internet. As an example, a request may be for weather information, the time, sports scores, a translation, a stock quote, calendar information, etc. semantics engine 340 may route smart-home device requests to smart device control engine 310.

Smart device control engine 310 may receive commands from controller communication interface 320 and as interpreted by semantics engine 340. Smart device control engine 310 may access smart device and account databases 390 to determine the smart devices associated with a particular account. Smart-device control engine may determine the appropriate smart-home devices to transmit a command and may transmit the command via smart device cloud API 360 (to the corresponding cloud-based server system that communicates directly with the smart-home device) and via direct smart device control API 370. Smart device control engine 310 may send smart device identifiers indicative of the smart devices that have been sent a command based on a spoken command to the smart-home controller via controller communication interface 320. Therefore, smart-home controller may receive information identifying the smart-home devices that were affected by a spoken command.

Figure 4:
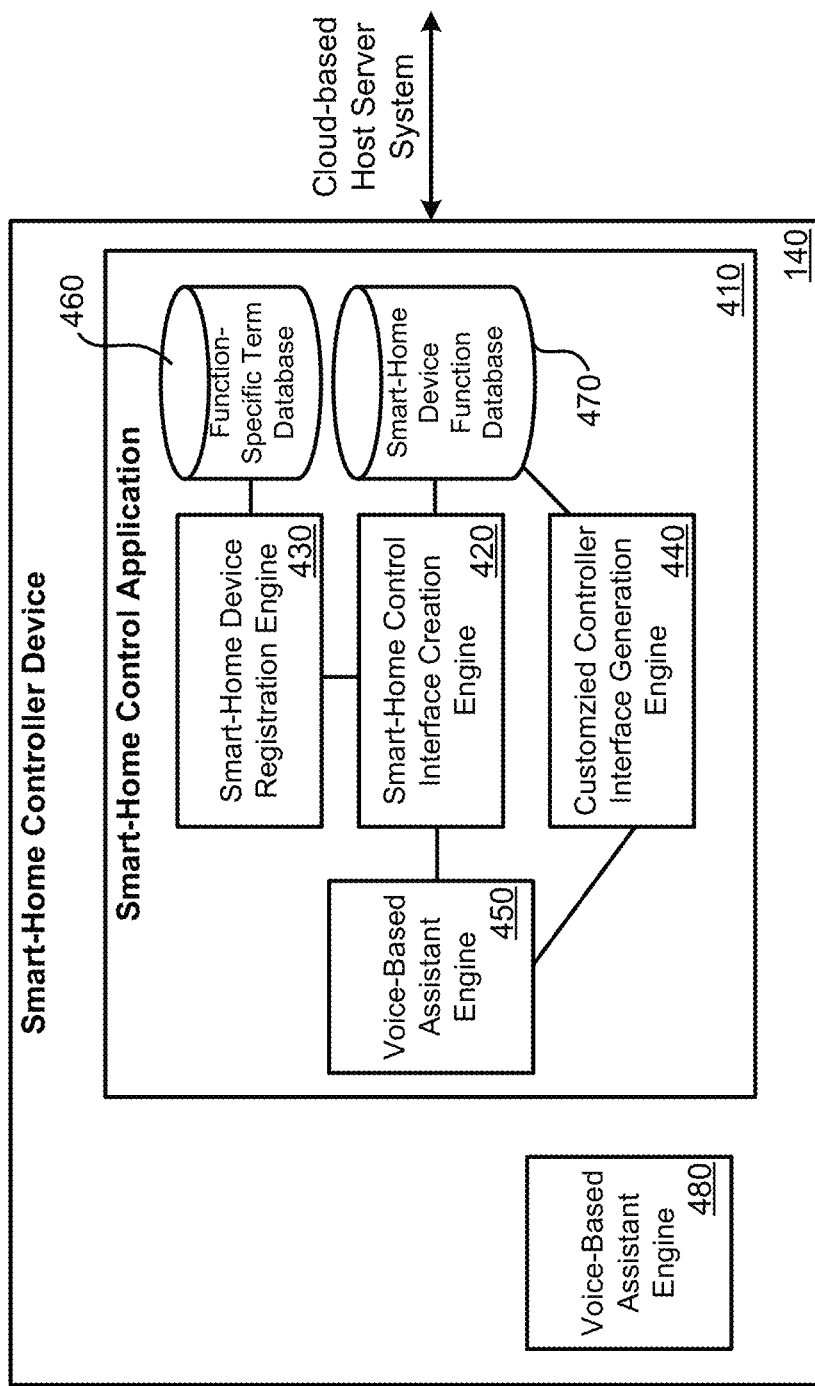
FIG. 4 illustrates a block diagram of an embodiment of a smart-home controller device.

FIG. 4 illustrates a block diagram of an embodiment of a smart-home controller device. Smart-home controller device 140 may perform multiple functions, including: presenting a graphical interface for a user to view the status of and control multiple smart-home devices (of which some of the smart-home devices may be controlled via different entities' cloud-based server systems); and receive and send vocal commands spoken by a user. Smart-home control device 140 may be a computerized device that includes components such as wireless (and/or wired) network interfaces, processors, communication buses, non-transitory computer readable storage mediums, memories, etc. Various components illustrated as part of smart-home controller device 140 may be performed using dedicated special-purpose hardware, firmware, or general-purpose hardware executing special-purpose software. It should be understood that the various components of smart-home controller device 140 may be broken out into a greater number of components or combined into a fewer number of components in different embodiments. Smart-home controller device 140 may include: voice-based assistant engine 480 and smart-home control application 410, which may be executed by underlying processing hardware of smart-home controller device 140. In some embodiments, smart-home control application 410 is downloaded onto smart-home controller device 140 from an application store. In other embodiments, smart-home controller device 140 may be purpose-built to have the functionality of smart-home control application 410. Voice-based assistant engine 480 may be triggered by a user speaking a key phrase or a user providing input to initiate listening. The user may then speak a vocal command that is passed to the cloud-based host server system for analysis and execution. A synthesized speech response may be output by voice-based assistant engine 480 based on data received in response to the vocal command passed to the cloud-based server system. Voice-based assistant engine 480 may execute regardless of whether smart-home control application 410 is being executed. In some embodiments, voice-based assistant engine 480 is incorporated as part of an operating system (OS) being executed by smart-home controller device 140.

Smart-home control application 410 may include: smart-home control interface creation engine 420; smart-home device registration engine 430; customized controller interface generation engine 440; voice-based assistant engine 450; function-specific term database 460; and smart-home device function database 470. Smart-home device registration engine 430 may receive information about a new smart-home device that is the registered with smart-home control application 410 and cloud-based host server system 120, regardless of whether the smart-home device is directly controlled by cloud-based host server system or controlled via another cloud-based server system. As part of the registration process, a user may be requested to provide information about the smart-home device. For example, the user may be requested to provide a name for the smart-home device. The user may typically name the smart-home device based on the function performed by the smart-home device and the location. For example, a user may select a name such as "kitchen light" to describe a smart light in the kitchen. As another example, "kitchen light" may be used for a smart outlet plug in the kitchen to which a conventional light is connected. Registration data received by smart-home device registration engine 430 may be stored locally and may also be transmitted to cloud-based host server system 120. Functions that can be performed by the smart-home device may be discovered during the smart-home device registration process. Indications of such functions may be stored to smart-home device function database 470 in association with an identifier of the smart-home device. Indications of the available functions may be retrieved from the cloud-based host computer system. For third-party smart-home devices, the cloud-based host computer system may request and retrieve indications of such functions from the cloud-based server system operated by the entity that provided the third-party smart-home device. Alternatively, the cloud-based host server system may maintain a database of available functions of third-party smart-home devices.

When the user provides a name for a smart-home device as part of the registration process, if the ultimate function of the smart-home device is not inherently determined by the type of smart device itself, function-specific term database 460 may be used to determine the intended use of a smart-home device from the user's name for the smart-home device. For example, a smart outlet plug can be used to control a variety of types of devices, such as a legacy appliance, a light, electronics, etc. A user may be expected to name the smart outlet plug something related to the device it is controlling, such as "bedroom window fan" or "dining room light." Function specific term database may store a variety of terms that are linked to a specific category of smart-home device. Table 1 provides some examples of terms and the associated smart-home device categories.

TABLE 1

| Function-Specific Term | Smart-home Device Category |
| --- | --- |
| Light | lighting |
| Lamp | Lighting |
| Bulb | Lighting |
| Speaker | Music/sound output |
| Stereo | Music/sound output |

If, during the registration process, a user provides a function specific term in the name of the smart-home device that performs an ambiguous function, based on the function specific term being present, smart-home device registration engine 430 may classify the smart-home device as being part of the smart-home device category mapped to the function specific term. For example, a smart outlet plug that has been named "dining room lamp" may be classified as part of the lighting smart-home device category. While FIG. 4 shows function specific term database 460 as part of smart-home control application 410, in other embodiments, function-specific term database 460 may be remotely located and may be accessible by smart-home device registration engine 430. For instance, function-specific term database 460 may be stored by cloud-based host server system 120.

Voice-based assistant engine 450 may function similarly to voice-based assistant engine 480, but may be incorporated as part of smart-home control application 410 and may specifically be used for providing smart-home related commands. Voice-based assistant engine 450 may capture an audio clip via a microphone of the smart-home controller device 140 in response to a user saying a trigger phrase or providing some form of user input indicating that the user desires to provide a voice-based command. The captured audio may be transmitted from voice-based assistant engine 450 to audio communication interface 330 of cloud-based host server system 120. The audio may be analyzed at the cloud-based host server system rather than at smart-home controller device 140. In response to sending the captured audio, voice-based assistant engine 450 may receive a response from the cloud-based host computer system indicating the smart-home identifiers of the smart-home devices that were sent to command based on a spoken command in the captured audio. The response may also indicate the updated state of the smart-home devices to which the command was sent.

Smart-home control interface creation engine 420 may create graphical interfaces that can be interacted with by user via a touchscreen or other form of user input device and is presented by smart-home controller device 140 or otherwise output for presentation (e.g., to a separate monitor). Smart-home control interface creation engine 420 may create an output user interfaces such as those detailed in relation to FIGS. 5-8. Smart-home control interface creation engine 420 may create individual tiles or coins that control both smart-home devices via direct smart device control API 370 and third-party smart-home devices via smart device cloud API 360.

Smart-home device function database 470 may store an indication of each smart-home device that is controlled via smart-home control application 410 and the functions that can be performed at each of the smart-home devices. For example, many smart-home devices may be able to be turned on and off, some smart lights may be able to be dimmed, smart thermostats may be able to receive a temperature setting, etc. smart-home device function database 470 may be accessed by smart-home control interface creation engine 420 to determine the functions that can be performed by a particular smart-home device. Smart-home control interface creation engine 420 may access smart-home device function database 470 to determine what functions are in common across particular smart-home devices such that a single control can be presented that controls multiple smart-home devices, even if some of such smart-home devices are provided by different entities and are controlled via different cloud-based server systems.

Customized controller interface generation engine 440 may be used in conjunction with voice-based assistant engine 450. In response to a voice command, voice-based assistant engine 450 may receive smart device identifiers for the smart devices affected by a spoken command. When these smart device identifiers are received, the identifiers may be passed to customized controller interface generation engine 440. Customized controller interface generation engine 440 may access smart-home device function database 470 to determine one or more functions that each of the smart-home devices have in common. A graphical control may be created that allows a user to control the same group of smart-home devices that was indicated in the spoken command. This control may include at least one common function across each of the smart-home devices. The control may also include one or more functions that are specific to a subset of the smart-home devices that was indicated in the spoken command. Therefore, customized controller interface generation engine 440 may generate a graphical interface after a spoken command has been submitted via voice-based assistant engine 450 and may allow a user to provide user input in the form of touch or some other form of on-screen control for the same set of smart-home devices that was previously controlled via a vocal command. Additionally or alternatively, customized controller interface generation engine 440 may be used with voice-based assistant engine 480.

Figure 5:
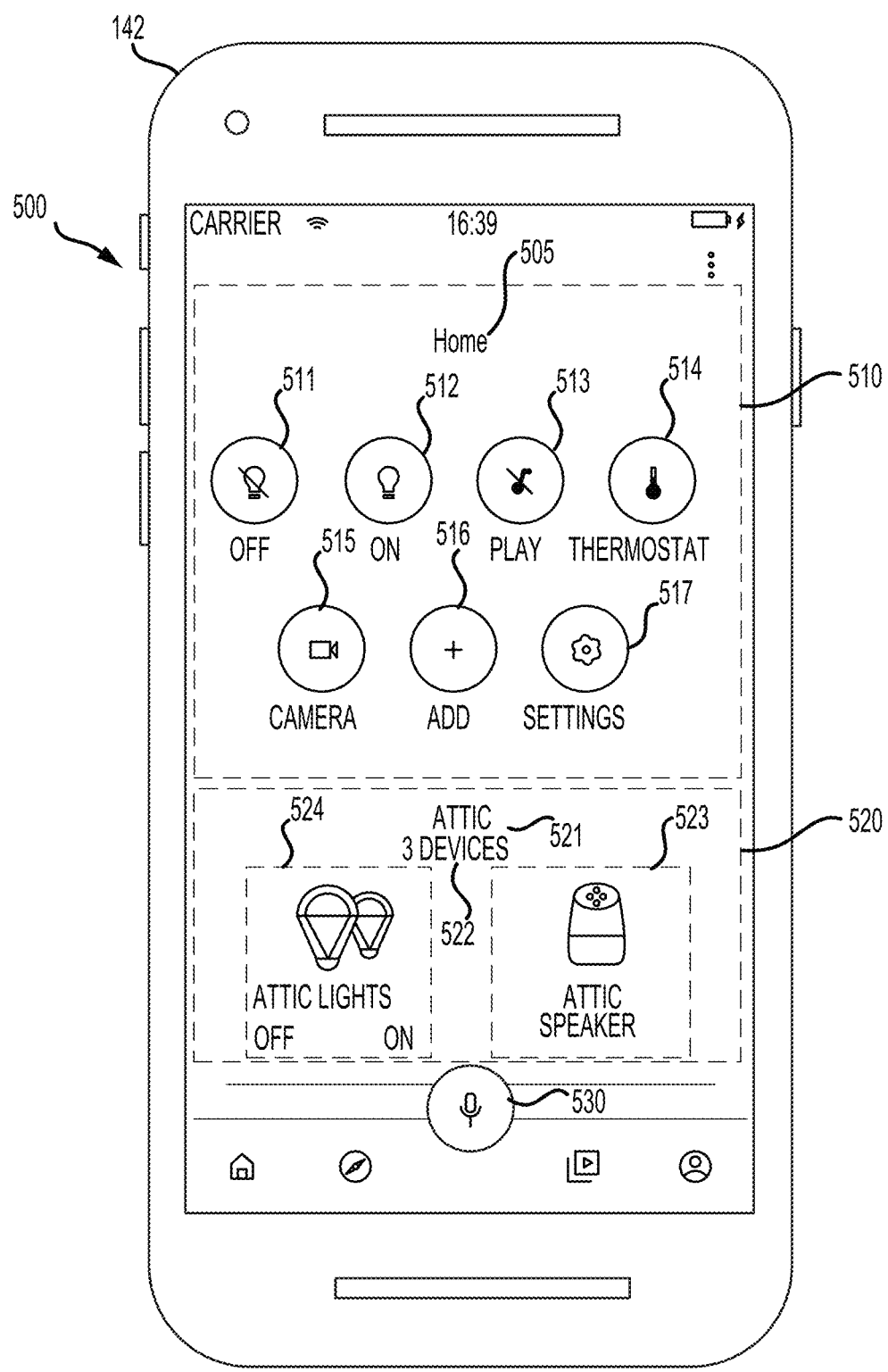
FIG. 5 illustrates an embodiment of an interface that may be presented by a smart-home controller device.

FIGS. 5-8 represent various control interfaces that may be presented by smart-home controller devices 140. In the illustrated embodiments, a smartphone 142 is used as an example of the smart-home controller device. In some embodiments, the control interfaces are presented using a touchscreen, in other embodiments, a separate user input device, such as a mouse is used to interact with the control interfaces. FIGS. 5-8 represent control interfaces that may be output by smart-home control application 410 for presentation by smart-home controller device 140 or a display device connected with smart-home controller device 140. FIG. 5 illustrates an embodiment of a control interface 500 that may be presented by a smart-home controller device, such as smartphone 142.

Top interface region 510 is devoted to whole-home smart-device controls. Top interface region 510 is labeled with location 505 that is indicative of the entire structure or other form of place where the smart-home devices are installed. Controls with top interface region 510 can include: off element 511; on element 512; play element 513; thermostat element 514; camera element 515; add element 516; and settings element 517.

The controls indicated by elements 511-516 pertain to smart-home devices controlled directly via the cloud-based host server system and third-party smart-home devices controlled by the cloud-based host server system via another cloud-based server system operated by another entity. Off element 511, when selected by a user, may trigger the smart-home control application to instruct the cloud-based host server system to turn off all lighting-related smart-home devices at location 505 that are located in lower location subcategories. (In other embodiments, when off element 511 is selected, a choice may be presented as to whether to turn off lighting-related devices for a given room or within the entire structure.) On element 512, when selected by a user, may trigger the smart-home control application to instruct the cloud-based host server system to turn on all lighting-related smart-home devices at location 505 that are located in lower location subcategories. (In other embodiments, when on element 512 is selected, a choice may be presented as to whether to turn off lighting-related devices for a given room or within the entire structure.) Play element 513, when selected by a user, may trigger the smart-home control application to instruct the cloud-based host server system to play or cease playing sound via eligible smart-home devices at location 505 that are located in lower location subcategories. Thermostat element 514, when selected by a user, may trigger the smart-home control application to instruct the cloud-based host server system to adjust the temperature or adjust an away/home setting at all smart thermostats installed in location 505 that are located in lower location subcategories. Camera element 515, when selected by a user, may trigger the smart-home control application to instruct the cloud-based host server system to stream video feeds to the smart-home control device for presentation from all cameras installed at location 505 that are located in lower location subcategories. Add element 516 may allow an additional function to be added to top interface region 510 based on one or more smart-home devices present in lower location subcategories. Alternatively, add element 516 may be used to link or register a new device. Settings element 517, when selected by a user, may trigger the smart-home control application to present various settings that a user is permitted to adjust for controlling smart-home devices located in lower location subcategories.

Based on received registration information received from a user via smart-home device registration engine 430, smart-home devices may be classified into one or more location subcategories. Location subcategories may be presented within control interface 500 at a lower location than top interface region 510. A first location subcategory presenting in control interface 500 is location subcategory 520 that has location 521 of "Attic." A user may specify location 521 and indicate which smart-home devices are installed at location 521. All smart-home devices indicated as being at location 521 are included in location subcategory 520. In the illustrated embodiment, three smart-home devices (of which at least some may be third-party smart-home devices) is indicated by smart-home device count 522, which is presented near location 521. In the illustrated embodiment, two lights are present at location 521, therefore control element 524, which may also be referred to as a control "coin" or "tile" is presented that includes: 1) a graphic that represents a group of the type of smart-home device and may be selected to present control elements for the individual lights; 2) a title of the group of lights ("Attic lights"), and control elements that allow the group of lights to be controlled using a single user input (by a user selecting "off" or "on"). Additionally, location subcategory 520 may include a smart-home device (in this case, a home assistant device) that can be used as a speaker. Control element 523 include: 1) a graphic element that represents the type of smart-home device; and 2) a user-assigned title of the smart-home device. Additional location subcategories may be presented by control interface 500 by a user scrolling down, such as seen in the embodiment of FIG. 6.

Additionally present in control interface 500 is spoken command control element 530. By a user selecting audio command control element 530, voice-based assistant engine 450 may be activated to capture audio using a microphone of smart-home controller device 140. This audio may be transmitted to cloud-based host server system 120 for analysis. When a user scrolls up or down within control interface 500, spoken command control element 530 remains fixed on control interface 500 such that while smart-home control application 410 is open, the user has an on-screen option to provide a spoken command to control the smart-home devices.

Figure 6:
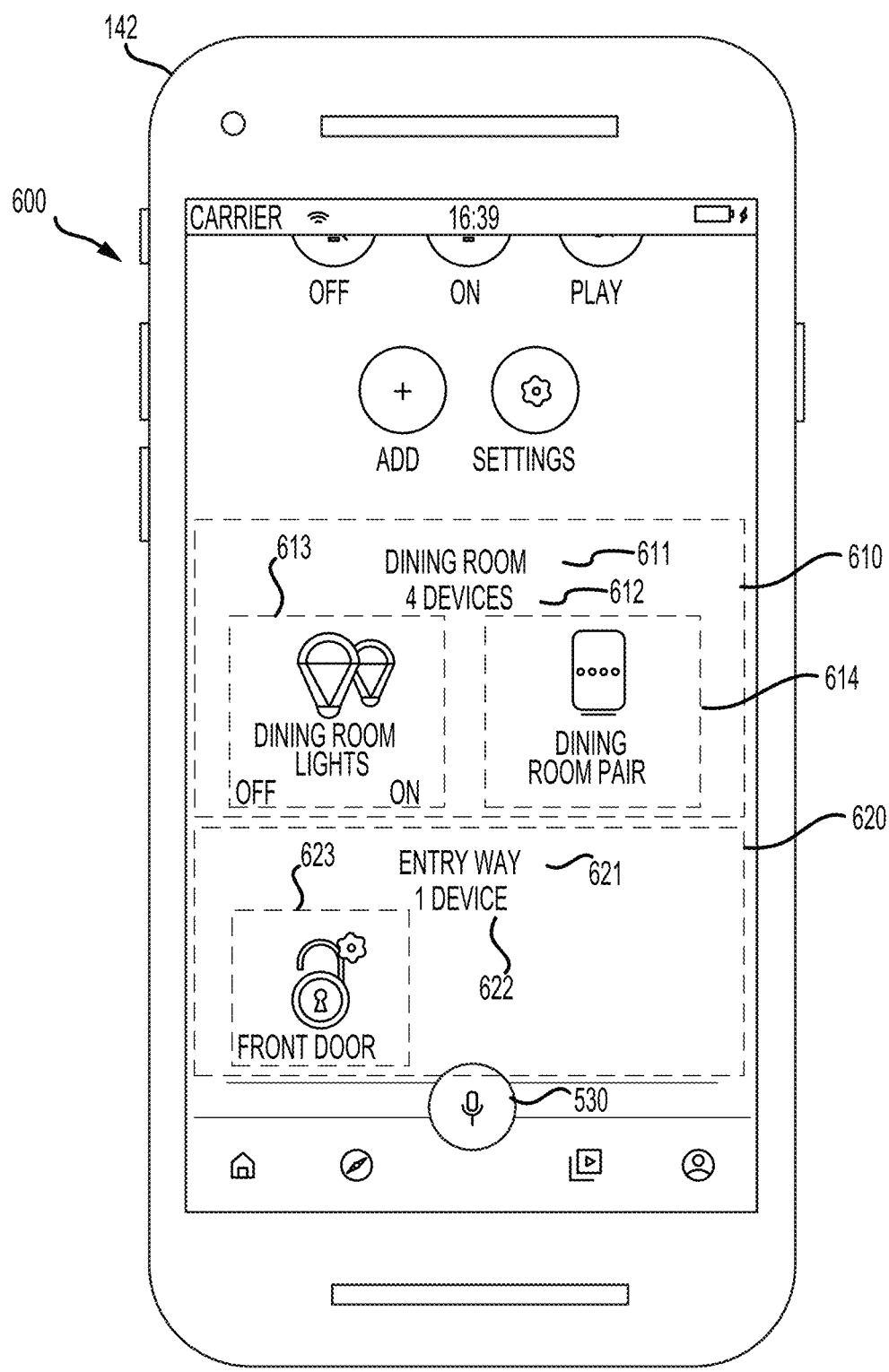
FIG. 6 illustrates an embodiment of an interface that may be presented by a smart-home controller device that includes grouped smart-home devices based on location.

FIG. 6 illustrates an embodiment of a control interface 600 that may be presented by a smart-home controller device that includes grouped smart-home devices based on location. In control interface 600, location subcategories 610 and 620 are presented. Location subcategory 610 corresponds to location 611 and has four devices as indicated by smart-home device count 612. If a user selects location 611, interface 700 of FIG. 7 may be presented. In the illustrated embodiment, three lights are present at location 611, therefore control element 613 may include: 1) a graphic that represents a group of the type of smart-home device and may be selected to present control elements for the individual lights and/or the current state of the group of lights; 2) a title of the group of lights ("Dining room lights"), and control elements that allow the group of lights to be collectively controlled using a single user input (by a user selecting "off" or "on"). Control element 614 may allow a user to pair a speaker at location 611 with a source (e.g., the smart-home control device) for output of sound.

Location subcategory 620 which corresponds to location 621 only includes one smart-device as indicated by smart-device count 622. Control element 623 visually represents a smart door lock and indicates the current state of the door lock (unlocked).

Figure 7:
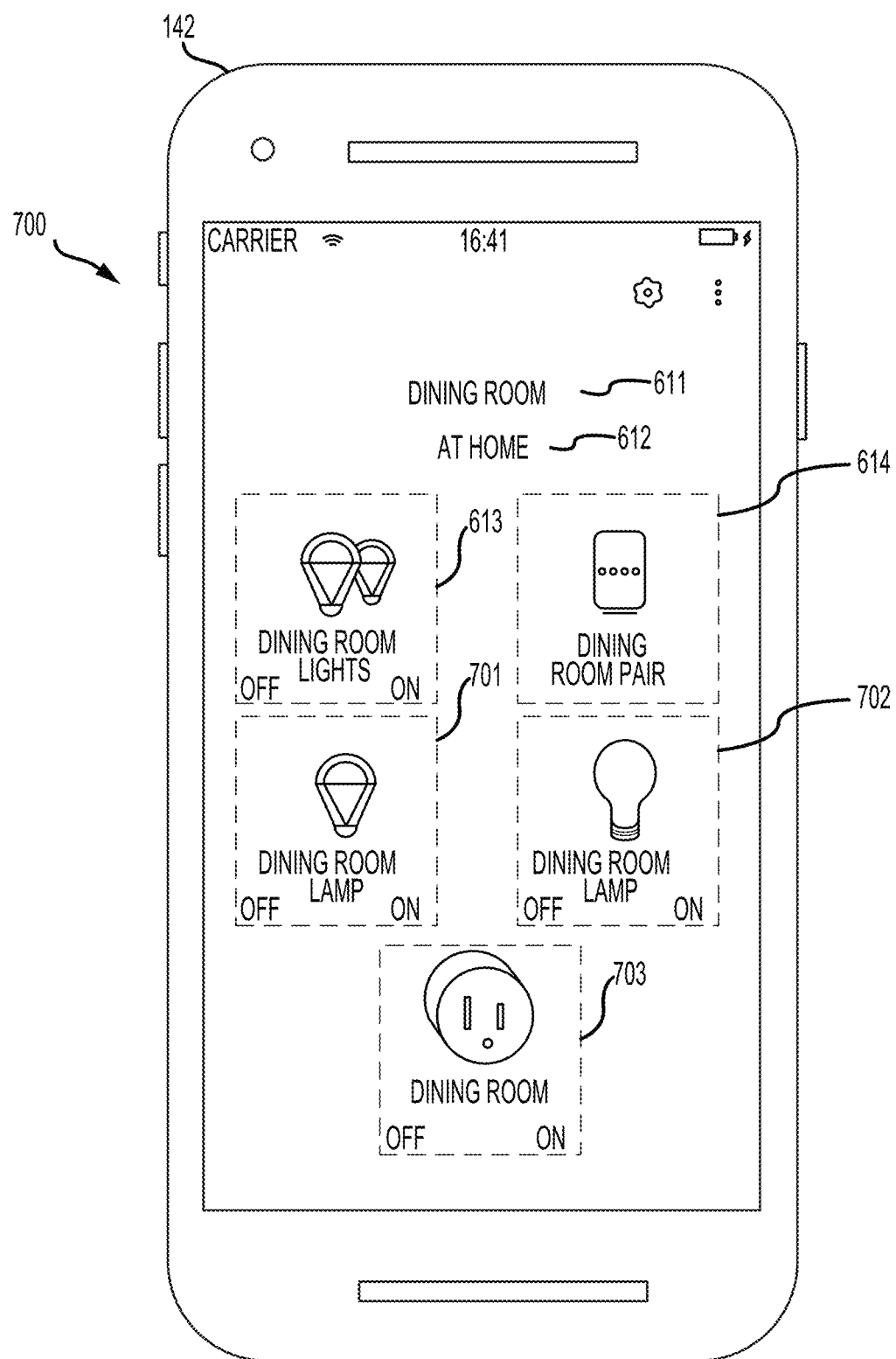
FIG. 7 illustrates an embodiment of an interface that may be presented by a smart-home controller device for a particular group.

FIG. 7 illustrates an embodiment of a control interface 700 that may be presented by smart-home controller device 140 for a particular location subcategory. Control interface 700 may be presented when a user selects location 611 in control interface 600. In interface 700, control elements are presented for: 1) groups of smart-home devices of the same type; and 2) each individual smart-home device. Control element 613 and control element 614 may function as detailed in relation to FIG. 6. Additionally, control elements 701, 702, and 703 are presented. Control element 701 may correspond to a smart light that is directly controlled by cloud-based host server system 120 via direct smart device control API 370. Control element 702 may correspond to a smart light made or distributed by another entity that is controlled by cloud-based host server system 120 via smart-device cloud API 360 and the entity's cloud-based server system. The graphical representations presented as part of control elements 701 and 702 may differ to illustrate the that each smart light is from a different manufacturer or entity. However, both of these smart lights can be controlled using the single control of control element 613.

Control element 703 comprises a graphical representation of a smart outlet plug. This smart outlet plug may have been grouped as part of the smart lights of location 611 on the basis of the name for the smart outlet plug provided for a user including the word "lamp." The graphical representation may remain as a smart outlet plug. In some embodiments the smart outlet plug is included as part of location 611 based on the word "dining" being used as part of the user-provided name.

Figure 8:
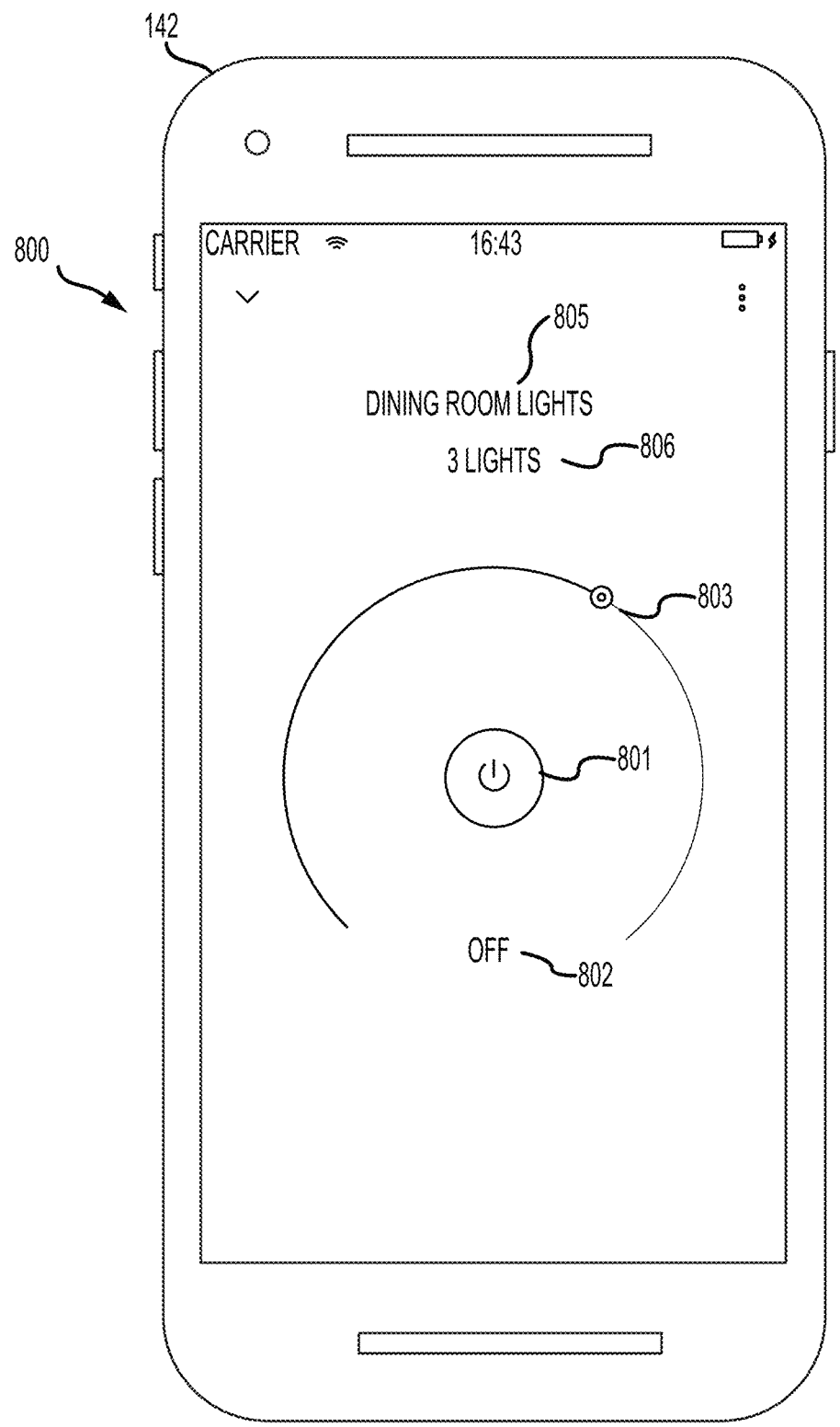
FIG. 8 illustrates an embodiment of a control that may be presented that can be used to control multiple smart-home devices.

FIG. 8 illustrates an embodiment of a control interface 800 that may be presented by smart-home controller device 140 that can be used to control multiple smart-home devices. Control interface 800 may be presented when control element 613 in selected from control interface 600 or interface 700. Of control interface 800, at least one control element controls all smart-elements within the selected group 805. Smart device count 806 indicates the number of smart devices that are controlled by the at least one control element that controls all smart-elements within the selected group 805. Control interface 800 may allow a single user input to control multiple smart lights which include smart lights controlled directly by cloud-based host server system and smart lights controlled via another cloud-based server system. Power control element 801 may control power for every smart light (that support a power control function) at location 611 and its state may be indicated by state 802. Therefore, with one instance of user input, a user can turn on or off all lights within the dining room, regardless of the manufacturer or entity from which the smart light was obtained. Dimmer control element 803 may allow for controlling the dim level of all smart-lights at location 611 that support the feature of dimming. Therefore, while power control element 801 controls all smart lights within selected group 805, control element 803 only controls smart lights that support the feature (which may be all or some of the smart lights within selected group 805). For example, a light controlled by a smart outlet plug, such as control element 703, may not be able to control brightness.

Figure 9:
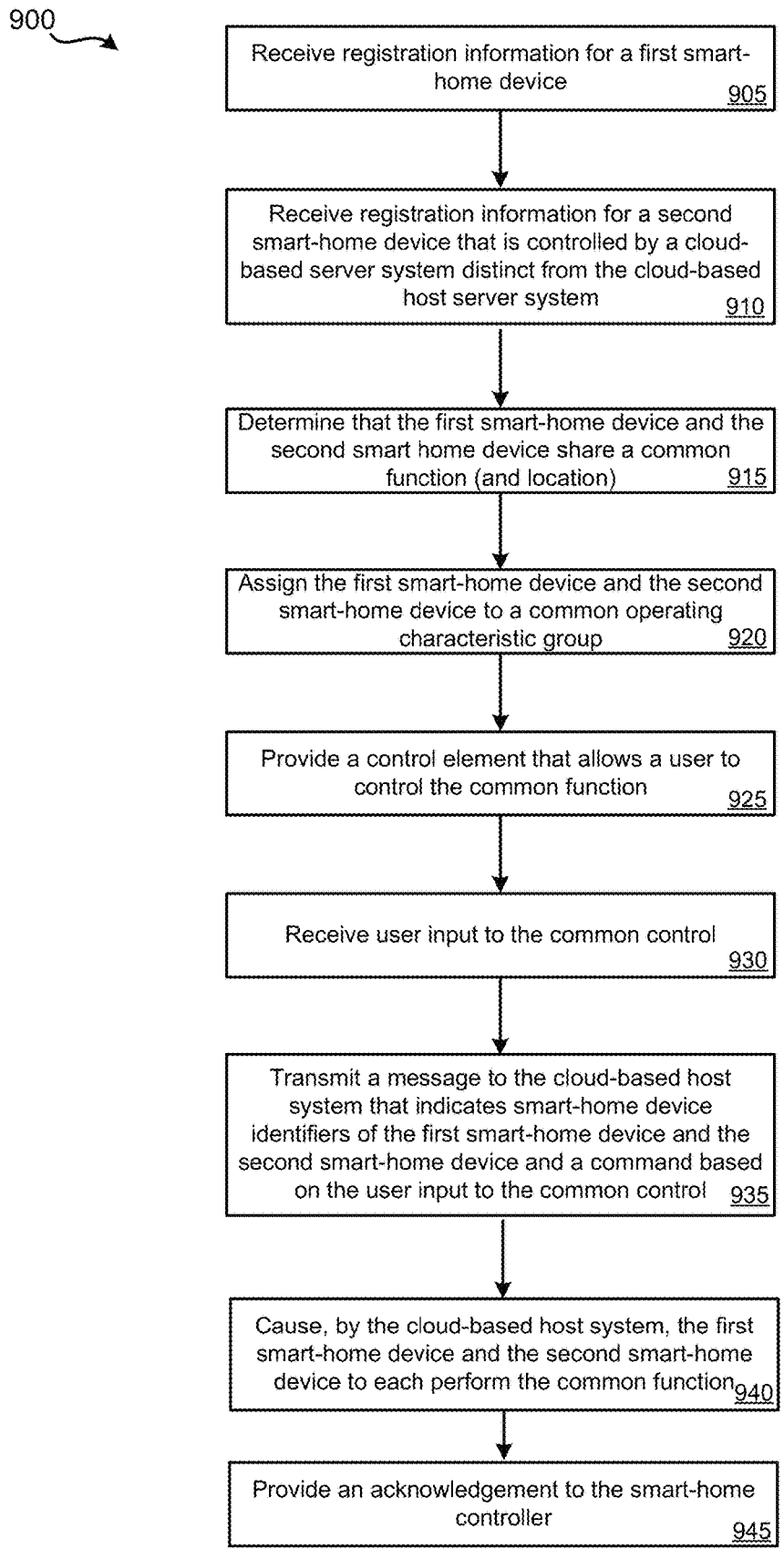
FIG. 9 illustrates an embodiment of a method for integrating control of multiple cloud-based smart-home devices.

Various methods may be performed using the systems and control interfaces of FIGS. 1-8. FIG. 9 illustrates an embodiment of a method 900 for integrating control of multiple cloud-based smart-home devices. Steps of method 900 may be performed using smart-home controller device 140, which may be executing smart-home control application 410. Smart-home controller device 140 may be functioning as part of system 100 and smart-home environment 200 of FIGS. 1 and 2, respectively.

At block 905, the smart-home control application 410 may receive registration for a first smart-home device by the smart-home control application or the registration information may be received by the cloud-based host server system. This smart-home device may be associated with the manufacture or entity that operates cloud-based host server system 120. Therefore, the first smart-home device may be controlled via direct smart device control API 370. As part of the registration process, the user may provide a user-defined name for the smart-home device. The user may, additionally or alternatively, provide a location that indicates a room or other area within or at a structure where the first smart-home device is located or will be located. In some embodiments, the location is selected from a predefined list of locations available within smart-home control application 410. For example, smart-home control application 410 may list the names of rooms that are commonly found within a residential home. In other embodiments, a user may specify a custom name for the location. In still other embodiments, the location at which the smart-home device was installed may be inferred from a name for the smart-home device defined by the user. For example, if the name includes the word "dining" it may be determined that the first smart-home device is installed in a dining room. The registration information may also include an identifier of the smart-home device which can be used to register the smart-home device with the cloud-based host computer system and, if necessary, with the cloud-based server system with which the cloud-based host computer system can communicate. In some embodiments, the cloud-based host computer system may return in indication of the type of smart device being registered and functions that the smart-home device is capable of performing. For the purposes of the remainder of method 900, it is assumed that the first smart-home device was registered with the cloud-based host computer system and the first smart-home device communicates directly with the cloud-based host computer system.

At block 910, registration information for a second smart-home device may be received by the smart-home control application or the registration information may be received by the cloud-based host server system. Registration for the second smart-home device may proceed similarly to block 910. In the illustrated embodiment of method 900, the second smart-home device is controlled via a cloud-based server system distinct from the cloud-based host server system. Therefore, when the second smart-home devices registered with the cloud-based host server system, the cloud-based host server system may provide at least some of the registration information to the cloud-based server system. In response, the cloud-based server system may provide indications of functions that may be performed by the second smart-home device. For the purpose of method 900, the first smart-home device and the second smart-home device are of a same type (e.g., are both types of smart lights) and have at least one function in common, such as both devices can be turned on and off (e.g., a "power function"). However, the first smart-home device in the second smart-home device are provided by different manufacturers or entities and are controlled using different cloud-based systems.

At block 915, a determination may be made by the smart-home control application 410 that a common function exists for the first smart-home device and the second smart-home device. In some embodiments, block 915 may be performed by the cloud-based host server system. This determination may be made by comparing a list of available functions for the first smart-home device determined during the registration of block 905 and the list of available functions for the second smart-home device determined during the registration of block 910. Block 915 may only be performed if the first smart-home device and the second smart-home device are determined to be of the same type (e.g., lights, speakers, locks, fans, thermostats, etc.). Block 915 may further include determining that the first smart-home device in the second smart-home device are being or have been installed at the same location (e.g., within a same room).

At block 920, the first smart-home device and the second smart-home device may be assigned to a common operating characteristic group by the smart-home control application. In some embodiments, block 920 may be performed by the cloud-based host server system. In some embodiments, the first smart-home device in the second smart-home device may be assigned to multiple common operating characteristic groups. For example, a first common operating characteristic group may be created for all smart-home devices of the same type within a structure. For example, such an arrangement may allow a control element such as element 511 and element 512 to control all smart lights within a structure. Alternatively or additionally, a second common operating characteristic group may be created for all smart-home devices of the same type within a particular location at a structure. For example, such an arrangement may allow for a control element such as control element 613 to control all smart lights in the dining room, regardless of the entity that provided the smart light.

At block 925, the smart-home control application may provide a control element that includes a control for allowing a user to control the common function determined at block 915. Therefore, by a user providing a single input to the control, the user can adjust a function or setting of multiple smart-home devices. In the example of method 900, the single input may adjust a function at the first smart-home device in the second smart-home device, which are controlled via different cloud-based systems.

At block 930, user input may be received to the control of the control element that allows a user to control the common function. A single instance of user input may be received at block 930, such as a single touch or a single click. As an example, referring to control element 613, a user may touch the "on" control to turn three smart lights on or the "off" control to turn three smart lights off. In this example, "on" and "off" would be common functions across the multiple smart lights. At block 935, the smart-home control application may cause the smart-home controller device to transmit a message to the cloud-based host system that indicates smart-home device identifiers of the first smart-home device in the second smart-home device (and any other smart-home devices that are of the same type, and, possibly location). The message may also include an indication of the command or function to be performed by each of the smart-home devices. In some embodiments, the user input may be provided to a device other than the device executing the smart-home control application. For instance, the user input may be provided to the cloud-based host server system.

At block 940, in response to the received message, the cloud-based host server system may cause the first smart-home device to perform the commander function. This may be performed by the cloud-based host server system communicating with the first smart-home device via direct smart device control API 370. Additionally, in response the received message, the cloud-based host server system may send an indication of the second smart-home device identifier and the command or function to a cloud-based server system that communicates with the second smart-home device. The cloud-based server system may then instruct the second smart-home device to perform the command or function. Therefore, by user providing a single user input at block 930, smart devices controlled via different cloud-based server systems may each be controlled. In some embodiments, the cloud-based server system may provide an acknowledgment as to whether the second smart-home device performed the command or function to the cloud-based host system. Additionally or alternatively, the cloud-based host server system may provide an acknowledgment to the smart-home control application indicating whether the function or command has been performed by the first smart-home device and/or the second smart-home device. Such an acknowledgment may permit presentation of an interface of the smart-home control application to be updated to reflect the current state of the first and second smart-home devices.

Figure 10:
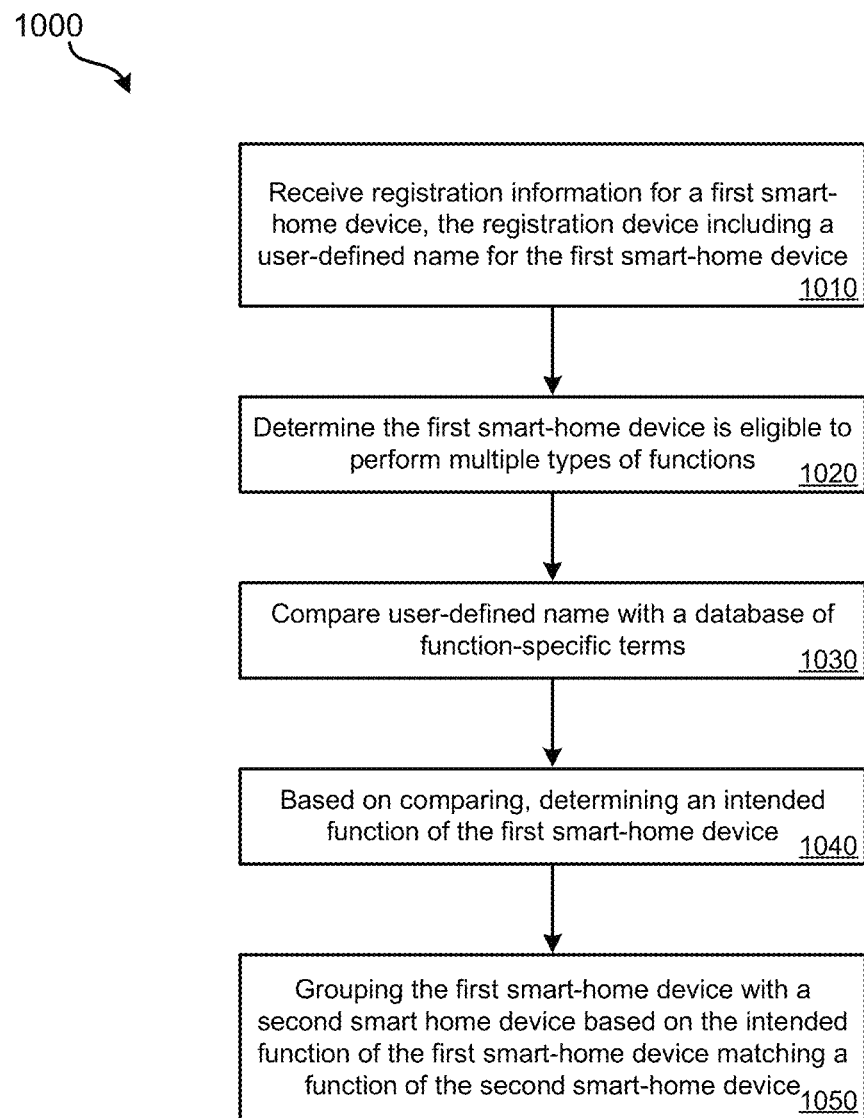
FIG. 10 illustrates an embodiment of a method for determining how to group a smart-home device.

FIG. 10 illustrates an embodiment of a method 1000 for determining how to group a smart-home device. Steps of method 1000 may be performed using smart-home controller device 140, which may be executing smart-home control application 410. Smart-home controller device 140 may be functioning as part of system 100 and smart-home environment 200 of FIGS. 1 and 2, respectively.

At block 1010, registration information may be received for a first smart-home device, as in block 905 of FIG. 9. As part of the registration process, the user may provide a user-defined name for the smart-home device. The user may, additionally or alternatively, provide a location that indicates a room or other area within or at a structure where the first smart-home device is located or will be located. In some embodiments, the location is selected from a predefined list of locations available within smart-home control application 410. For example, smart-home control application 410 may list the names of rooms that are commonly found within a residential home. In other embodiments, a user may specify a custom name for the location. The first smart-home device may communicate directly with the cloud-based host server system or through another cloud-based server system if it is a smart-home device manufactured or distributed by a third-party.

At block 1020, a determination may be made at the first smart-home devices eligible to perform multiple of functions. Block 1020 may be performed by the smart-home application or by the cloud-based host server system. Which functions may be performed by the first smart-home device may be based on inquiry being made to the cloud-based host server system or a cloud-based server system which communicates with the cloud-based host server system. In other embodiments, a database may be maintained locally by the smart-home control application that indicates the available functions of various types of smart-home devices. An identifier of the first smart-home device may be used by either the smart-home host server system or the smart-home control application to perform a lookup within the database. As an example, a smart outlet plug may be considered one type of smart-home device that is eligible to perform multiple types of functions. The smart-home outlet plug may be able to turn on and off a device that is plugged into the smart-home all the plug. Therefore, the function of first smart-home device may be considered to be the function of whatever devices plugged into the smart-home outlet plug. Typical devices that may be plugged into the smart-home all the plug may be a light, a fan, or a small appliance (e.g., coffee maker, toaster oven, etc.).

Based on block 1020 being determined that the first smart-home devices eligible to perform multiple types of functions, a comparison may be made at block 1030 to compare the user-defined name received at block 1010 with the database of function specific terms. The database a function specific terms may be similar to those presented in Table 1. The comparison of block 1030 may be performed locally by the smart-home controller application or may be performed remotely by the cloud-based host server system. Block 1030 may be performed by the smart-home application or by the cloud-based host server system.

At block 1040, based on the comparison of block 1030, a determination may be made as far as the intended function of the first smart-home device. Block 1040 may be performed by the smart-home application or by the cloud-based host server system. Therefore, while the first smart-home device may be of a first type, the way the first smart-home devices being used may be more accurately described based on its intended function. As an example of this consider a smart-home outlet plug that is connected with a light. From a user's point of view, the first smart-home device is causing the light to function as a smart light. Therefore, the smart-home outlet plug may have its intended function be determined as lighting.

At block 1050, the first smart-home device may be grouped with a second smart-home device based on the intended function of the first smart-home device matching the function of the second smart-home device by the smart-home application or by the cloud-based host server system. Returning to the previous example, the smart outlet plug may be grouped with a smart light (the second smart-home device) due to the intended function of the first smart-home device matching the function of the smart light. Another example of this can be seen in FIG. 6, in which control element 703 controls a smart outlet plug as part of a group of lights that includes control element 701 and control element 702. The intended function of the smart outlet plug is determined to match a function of the other lamps.

Additionally, grouping may be further based on location within a structure. For example, a smart outlet plug may only be grouped with a second smart-home device that matches the smart outlet plug's intended function if the smart-home outlet plug in the second smart-home device are indicated as being present at a same location. In some embodiments, similar to the user defined name being analyzed for an intended function using a database of function specific terms, the user defined name may be analyzed for an intended location using a database of location names. Therefore, rather than a user selecting a location from a list or otherwise providing a specific location, the user defined name may be used to determine the location.

As detailed in relation to FIG. 4, a voice-based assistant engine may be used to control smart-home devices. Such a voice-based assistant engine may function as part of smart-home control application 410 or be separately executed by smart-home controller device 140, such as by or part of an operating system of smart-home controller device 140. FIGS. 11-14 illustrate embodiments of interfaces that may be presented using a smart-home controller device. In the illustrated embodiments, a smartphone 142 is used as an example of the smart-home controller device.

Figure 11:
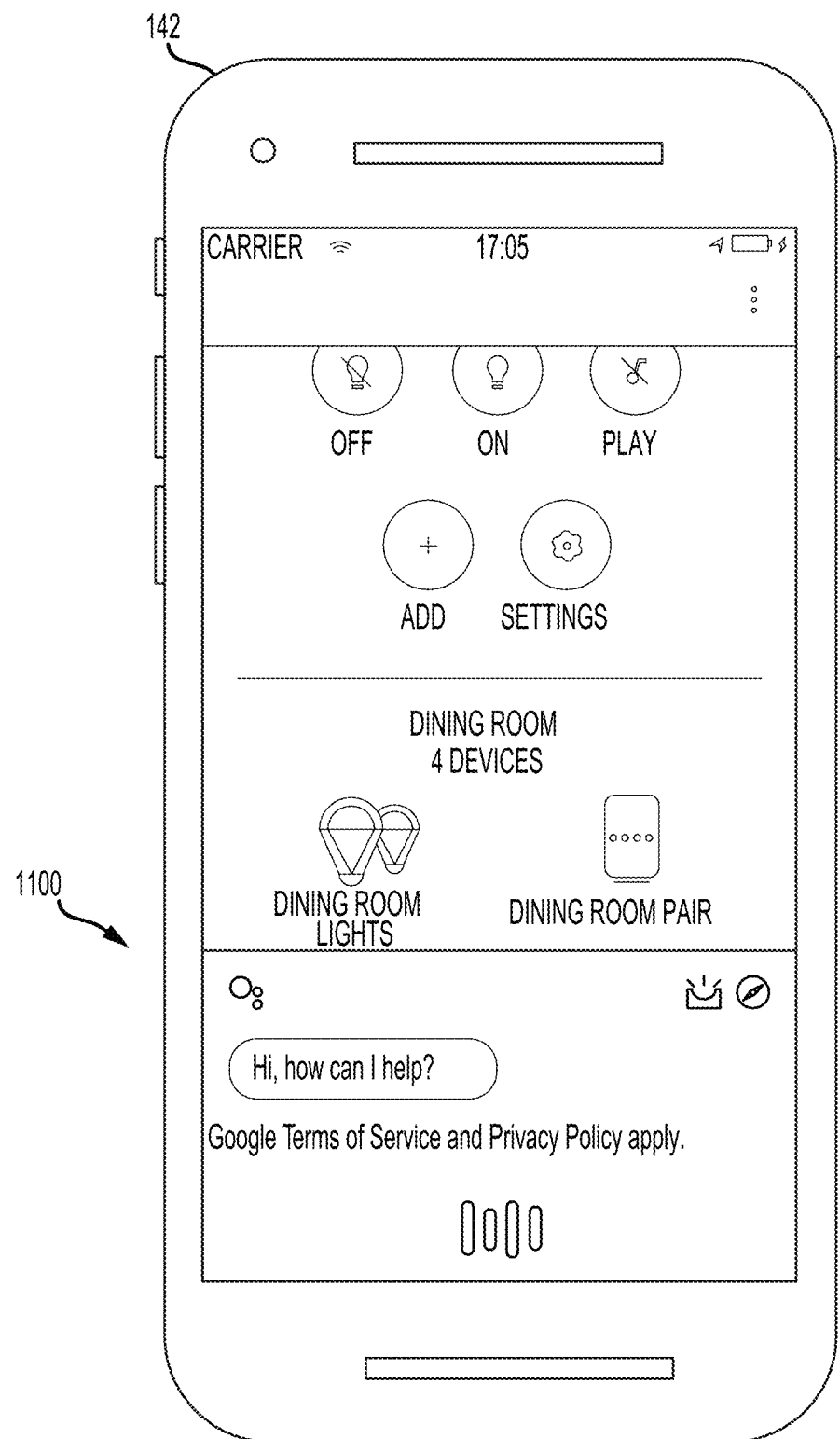
FIG. 11 illustrates an embodiment of a control interface that may be presented when ready to capture an audio sample.

FIG. 11 illustrates an embodiment of an audio command control 1100 that may be presented when a smart-home controller device is ready to capture an audio sample. Audio command control 1100 may be presented when a user has selected spoken command control element 530. Alternatively, a user may speak a trigger phrase (e.g., "OK Home Assistant") or provide some other form of input (e.g., squeezing the sides of the smart-home controller device). Once audio command control 1100 is active, one or more microphones of the smart-home controller device may be being used to capture audio from the environment.

Figure 12:
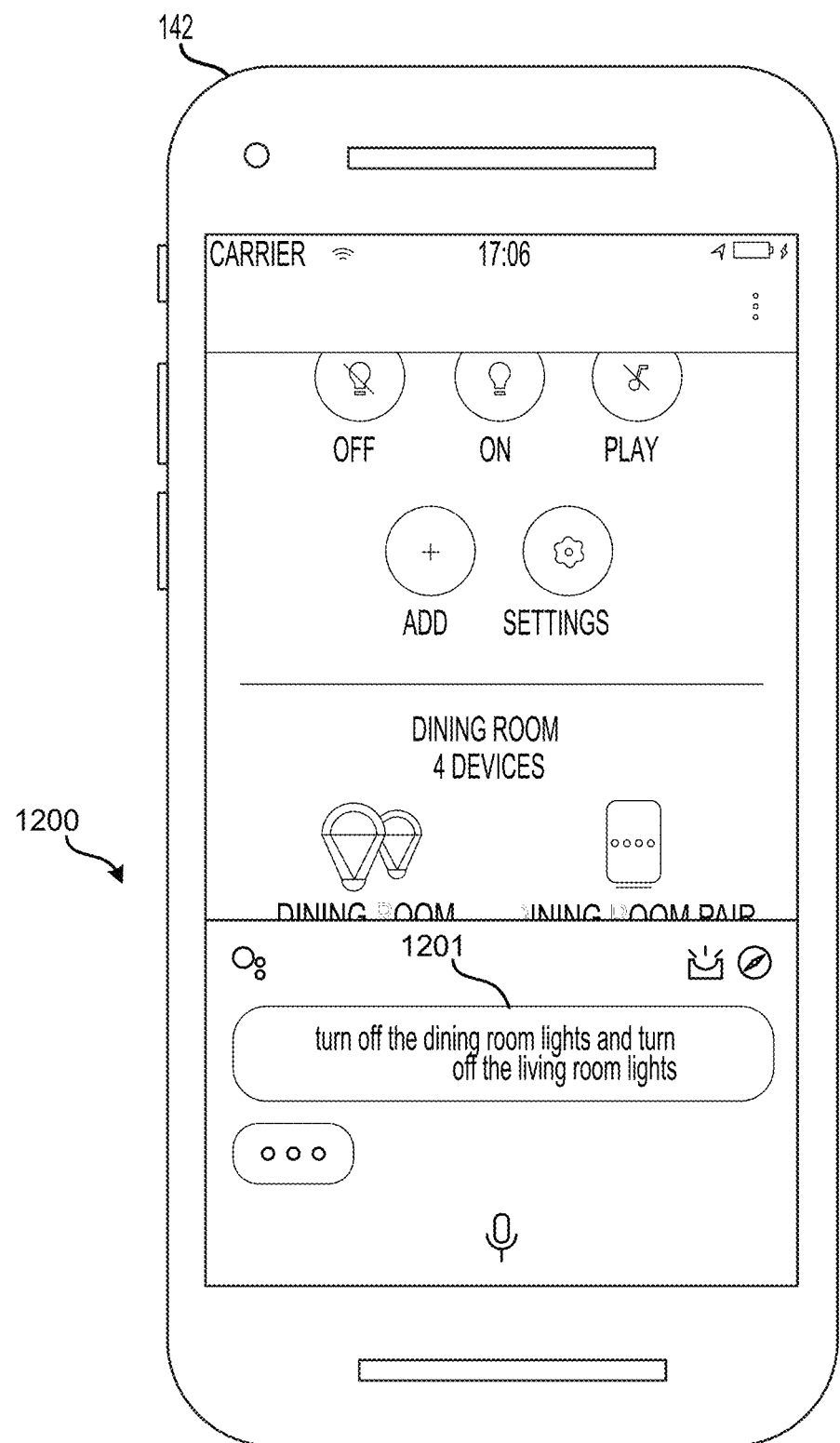
FIG. 12 illustrates an embodiment of a control interface that may be presented while capturing an audio sample.

FIG. 12 illustrates an embodiment of an audio command control 1200 that may be presented while capturing an audio sample. When a user starts speaking a command, as the audio is received, a voice recognition process may be performed at the cloud-based server system. Text that represents the speech (representative text 1201) may be presented via audio command control 1200. In other embodiments, the speech is analyzed locally by the voice-based assistant engine rather than being sent to the cloud for analysis. Presentation of the text of the words being recognized from the spoken command allows a user to confirm the spoken command is being interpreted correctly. In the example of FIG. 12, a user has spoken "turn off the dining room lights and turn off the living rooms lights." Therefore, with this single command, the user is trying to collectively control both smart lights in dining room and living room.

Figure 13:
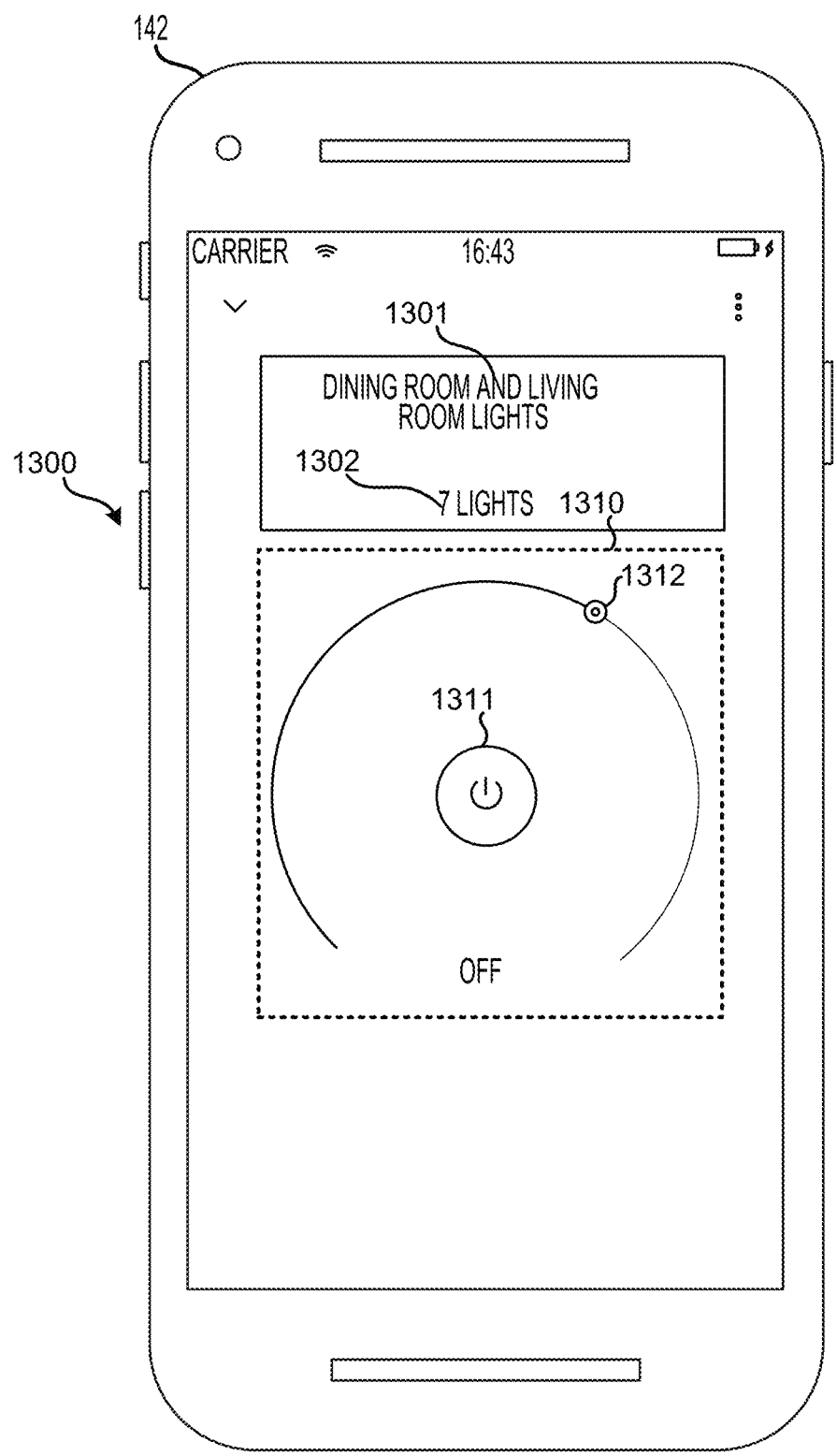
FIG. 13 illustrates an embodiment of a control interface that can control a common function across smart-home devices indicated in the audio sample.

FIG. 13 illustrates an embodiment of an interface 1300 that includes a custom interface control 1310 that can control a common function across smart-home devices indicated in the audio sample. Interface 1300 is presented in response to the command indicated by representative text 1201 being performed. Custom location group 1301 indicates the group of locations indicated by the user in the spoken command. Smart device count 1302 indicates the total number of smart-home devices that were controlled based on the spoken command indicated by representative text 1201. Control element 1311 may allow for control of all smart-home devices indicated by smart device count 1302 to perform a function that is common to all of the smart-home devices that were controlled based on the spoken command. In this case, control element 1311 can receive user input to adjust whether the previously-controlled smart-home devices are turned on or off.

In some embodiments, one or more additional control elements may be present. In this embodiment, control element 1312 is present, which is a dimmer control that allows for some or all of the controlled smart-home devices to have their brightness controlled. By control element 1312 being present, this is an indication that at least one of the smart-home devices controlled via the spoken command can have its brightness controlled. In some embodiments, control element 1312 may only be presented and available if this function is available across all smart-home devices controlled by the spoken command indicated by representative text 1201.

Figure 14:
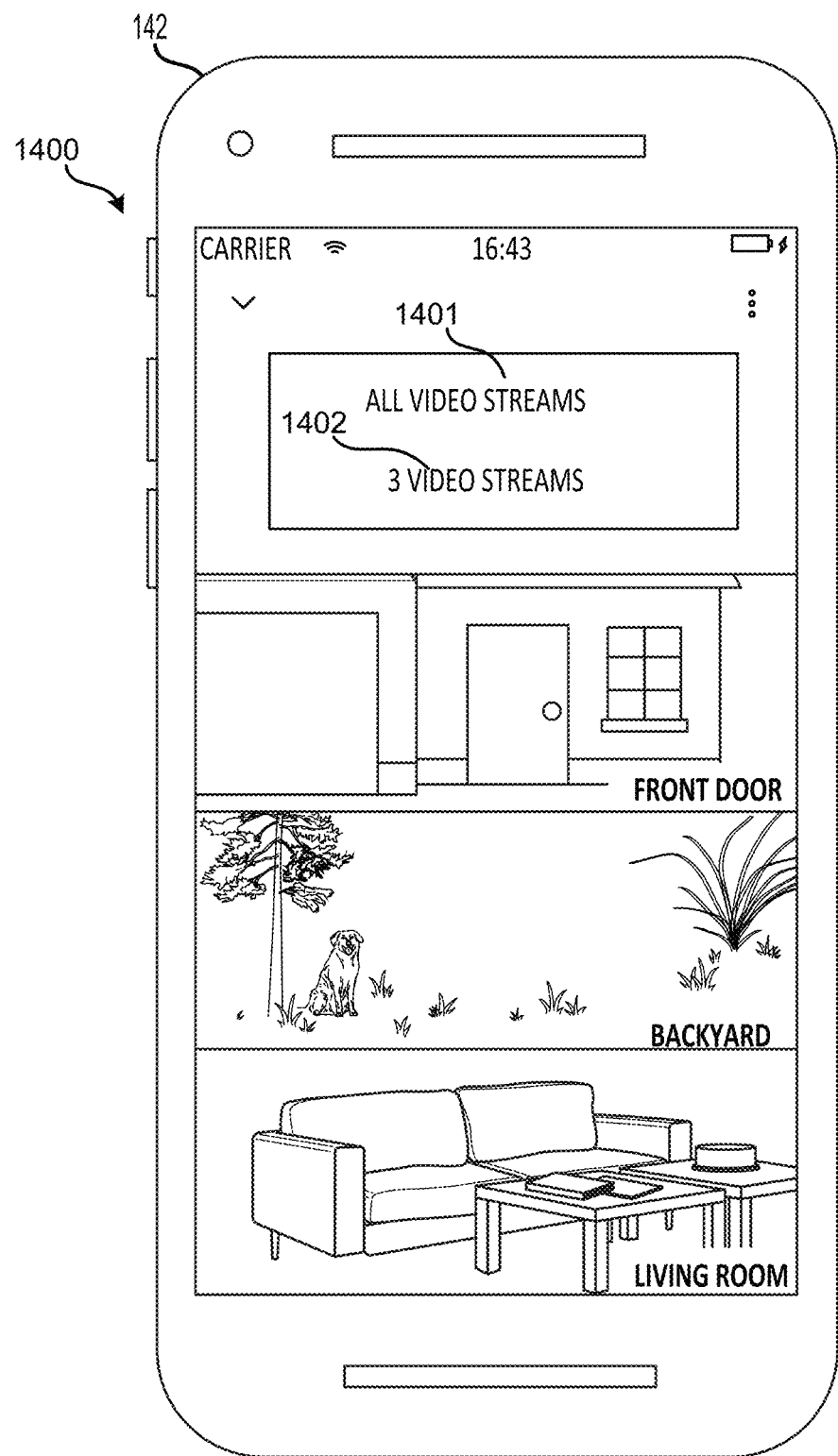
FIG. 14 illustrates an embodiment of an interface that allows a user to view video streams indicated in the audio sample.

FIG. 14 illustrates an embodiment of a custom interface 1400 allows a user to view video streams indicated in the audio sample. Custom interface 1400 may presented in response to a user providing an audio command of "show all of my video feeds." This command may result in each video feed that is received by the smart-home host server system being output for presentation to custom interface 1400. Title 1401 may be representative of the custom group of videos that the user indicated in the voice command. Device count 1402 indicates the number of video streams linked to the user's account. Each video stream (1403, 1404, 1405) may be presented for viewing.

Figure 15:
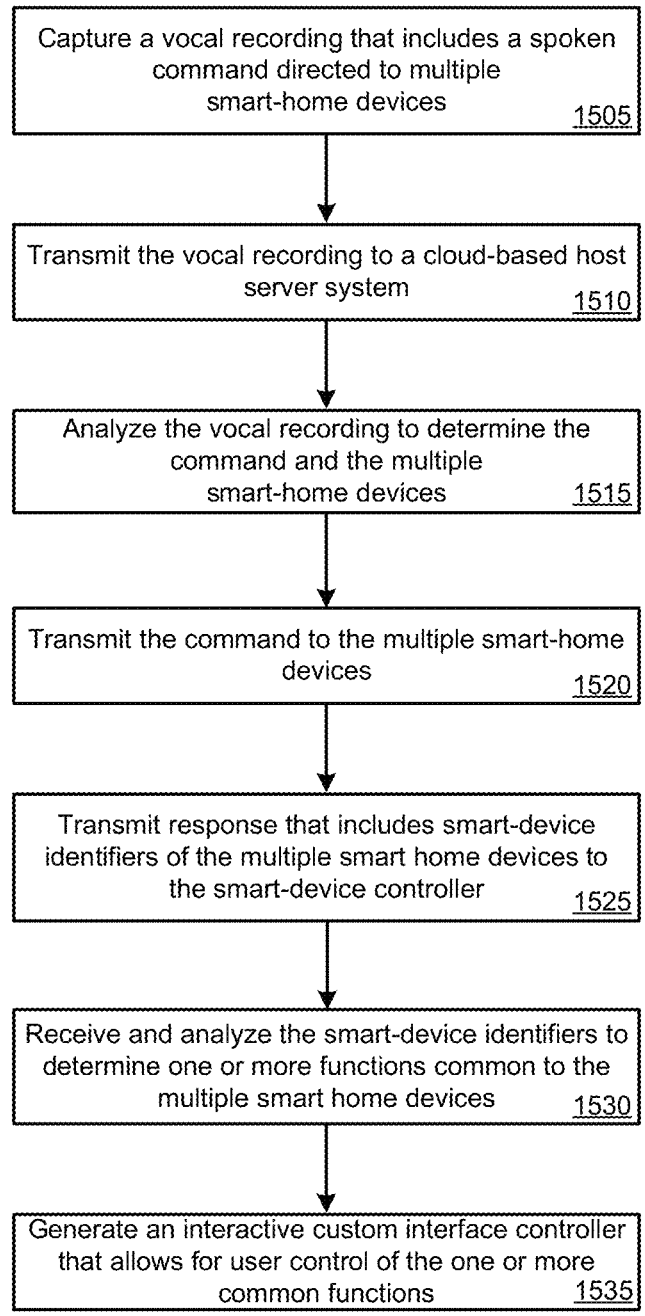
FIG. 15 illustrates an embodiment of a method for using captured voice to generate an interactive custom interface controller.

FIG. 15 illustrates an embodiment of a method 1500 for using captured voice to generate an interactive custom interface controller. Steps of method 1500 may be performed using smart-home controller device 140, which may be executing smart-home control application 410. Smart-home controller device 140 may be functioning as part of system 100 and smart-home environment 200 of FIGS. 1 and 2, respectively.

At block 1505, a local recording may be captured using the smart-home controller device that includes a spoken command intended by the user to be directed to multiple smart-home devices. Alternatively, the recording may be captured using some other device. These multiple smart-home devices may be spread among multiple locations or concentrated at a particular location. These multiple smart-home devices may also represent a subset of smart-home devices located at a particular location. The multiple smart-home devices may be of different types or of the same type. The multiple smart-home devices may include smart-home devices that are directly controlled by the cloud-based host server system and may include smart-home devices that are controlled by the cloud-based host server system via another cloud-based server system. Therefore, the user has considerable flexibility in the smart-home devices that can be controlled using a single spoken command. As previously detailed the smart-home controller device may be ready to receive a spoken command when an interface similar to that of audio command control 1100 is presented.

At block 1510, the vocal recording may be transmitted to the cloud-based host server system to analyze the contents and meaning. In other embodiments, the vocal recording may be analyzed locally. The vocal recorded captured at block 1505 may be transmitted as the audio is received to the cloud-based host server system to allow for analysis as the voice recording is still being received. At block 1515, the vocal recording may be translated from audio into text by the cloud-based host server system. In other embodiments, the vocal recording may be analyzed locally by the smart-home controller device. A semantics engine may analyze the intended meaning of the text including the command to be performed the smart-home devices at which the command is intended to be executed.

At block 1520, the command may be transmitted to the smart-home devices determined at block 1515. The command may be transmitted to smart-home devices with which the cloud-based host server system directly communicates and smart-home devices with which the smart-home host server system communicates with via another cloud-based server system. In some embodiments, the smart-home controller device may communicate directly with the cloud-based host server systems associated with various smart-home devices. At block 1525, a response may be transmitted to the smart-home controller device at which the vocal recording was initially received. The response may indicate smart-home device identifiers indicative of each smart-home device to which the command was transmitted by the smart-home host server system. Therefore, if the smart-home host server system sent the command to six smart-home devices, six smart-home identifiers would be transmitted to the smart-home controller device. In some embodiments, rather than the smart-home devices being controlled via cloud-based server systems, the smart-home controller device may communicate with and control the smart-home devices directly (e.g., via a direct wireless communication method or via a mesh network).

At block 1530, the smart-home device identifiers may be received and then analyzed by the smart-home control application being executed by the smart-home controller device. Each of the smart-home device identifiers may be used to identify the associated smart-home devices and access a smart-home device function database to determine what one or more functions (or intended functions) each smart-home device is capable of. This analysis may include determining if there are one or more functions in common across all of the smart-home devices that were controlled via the spoken command this analysis may also include determining if there one or more functions in common across some of the smart-home devices that were controlled via the spoken command. (In other embodiments, such a function may be present at only one of the smart-home devices that were previously controlled via the voice-based command.) In some embodiments, rather than the analysis of block 1530 being performed at the application executed by the smart-home controller device, the analysis may be performed by the cloud-based host server system to determine what functions each device is capable of and determine if one or more functions are in common across the smart-home devices.

If there is at least one function that is in common across all of the smart-home devices that were controlled via the spoken command, a custom interface controller may be generated at block 1535 that includes one or more controls that allow for user control of the one or more common functions of the smart-home devices that were the subject of the spoken command. This custom interface controller may not have been available to a user via the application prior to block 1535. For example, no interface controller may be available that controls lights in two distinct rooms. Therefore, block 1530 results in the creation of an interface at block 1535 that otherwise would not exist or be available. The custom interface controller may also include one or more controls that control one or more functions that are in common across some of the smart-home devices that were controlled via the spoken command. Therefore, the presented custom interface controller allows a user to provide additional input to control the smart-home devices that were previously controlled via a voice-based command. In some embodiments, even if there is not one function in common across the smart-home devices indicated by the spoken command, a custom interface controller may be generated that includes a control for a majority of the smart-home devices controlled via the spoken command.

Using the custom interface controller generated at block 1535 that is being output for presentation, a user may provide user input (e.g., via touch) to further control all or some of the smart-home devices previously controlled via the spoken command. In response to such further input, the smart-home control application may determine one or more commands to be performed by the smart-home devices. The command, along with the smart-home device identifiers indicative of the smart-home devices that are to perform the command may be transmitted to the cloud-based host server system for execution. The cloud-based host server system then may control one or more smart-home devices directly and/or may communicate with one or more other cloud-based server systems to control the corresponding smart-home devices.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for using captured voice to generate a custom interface controller, the method comprising:
    capturing, via a mobile device, a vocal recording from a user, wherein the vocal recording comprises a spoken command directed to a plurality of smart-home devices;
    transmitting the vocal recording to a cloud-based server system to perform natural language processing on the spoken command;
    receiving, by an application executed by the mobile device, a response from the cloud-based server system that comprises a plurality of smart-home device identifiers, wherein:
        the plurality of smart-home device identifiers were identified by the cloud-based server system based on the natural language processing performed on the spoken command;
        the plurality of smart-home device identifiers correspond to multiple different types of smart-home devices; and
        the spoken command is implemented at the plurality of smart-home devices mapped to the plurality of smart-home device identifiers;
    determining, by the application executed by the mobile device, by accessing a home device function database, two or more common functions that map to the plurality of smart-home devices based on the plurality of smart-home device identifiers that were received in the response from the cloud-based server system based on the natural language processing performed on the spoken command, wherein:
the home device function database is stored by the mobile device and maps the plurality of smart-home device identifiers with functions; and
generating, by the application executed by the mobile device, two or more control elements, which are presented as part of a single custom interface controller, that control the two or more common functions of each smart-home device of the plurality of smart-home devices for which smart-home device identifiers were received from the cloud-based server system, wherein:
each control element of the two or more control elements is mapped to a common function of the two or more common functions; and
the custom interface controller indicates a count of smart-home devices controlled by the custom interface controller based on the plurality of smart-home device identifiers received from the cloud-based server system.

2. The method for using the captured voice to generate the custom interface controller of claim 1, further comprising:
receiving, by the application executed by the mobile device, user input via the custom interface controller and a touchscreen of the mobile device.

3. The method for using the captured voice to generate the custom interface controller of claim 2, further comprising:
determining, by the application executed by the mobile device, a command to be performed by each of the plurality of smart-home devices based on the user input received via the custom interface controller; and
transmitting, by the application executed by the mobile device, the command and the plurality of smart-home device identifiers to the cloud-based server system.

4. The method for using the captured voice to generate the custom interface controller of claim 3, further comprising:
in response to receiving the command and the plurality of smart-home device identifiers from the application executed by the mobile device, transmitting, to a second cloud-based server system, an indication of the command and a smart-home device identifier of the plurality of smart-home device identifiers, wherein the second cloud-based server system communicates with a second smart-home device mapped to the smart-home device identifier.

5. The method for using the captured voice to generate the custom interface controller of claim 3, further comprising:
in response to receiving the command and the plurality of smart-home device identifiers from the application executed by the mobile device, transmitting, a second indication of the command to a second smart-home device mapped to a second smart-home device identifier of the plurality of smart-home device identifiers.

6. The method for using the captured voice to generate the custom interface controller of claim 1, wherein:
the vocal recording additionally indicates a location and a type of smart-home device; and
the cloud-based server system causes the spoken command to be performed at the plurality of smart-home devices based on the plurality of smart-home devices matching the location and the type of smart-home device indicated in the vocal recording.

7. The method for using the captured voice to generate the custom interface controller of claim 1, further comprising:
analyzing, by the cloud-based server system, the vocal recording to determine the spoken command and the plurality of smart-home devices.

8. A system for using captured voice to generate a custom interface controller, the system comprising:
a smart-home application executed by a mobile device that causes the mobile device to:
capture, via one or more microphones, a vocal recording from a user, wherein the vocal recording comprises a spoken command directed to a plurality of smart-home devices;
transmit, via a network interface of the mobile device, the vocal recording to a cloud-based host server system to perform natural language processing on the spoken command;
receive a response from the cloud-based host server system that comprises a plurality of smart-home device identifiers, wherein:
the plurality of smart-home device identifiers were identified by the cloud-based host server system based on the natural language processing performed on the spoken command;
the plurality of smart-home device identifiers correspond to multiple different types of smart-home devices; and
the spoken command is implemented at the plurality of smart-home devices mapped to the plurality of smart-home device identifiers;
determine, by accessing a home device function database, two or more common functions that map to the plurality of smart-home devices based on the plurality of smart-home device identifiers that were received in the response from the cloud-based host server system based on the natural language processing performed on the spoken command, wherein:
the home device function database is stored by the mobile device and maps the plurality of smart-home device identifiers with functions; and
generate two or more control elements, which are presented as part of a single custom interface controller, that control the two or more common functions of each smart-home device of the plurality of smart-home devices for which smart-home device identifiers were received from the cloud-based host server system, wherein:
each control element of the two or more control elements is mapped to a common function of the two or more common functions.

9. The system for using the captured voice to generate the custom interface controller of claim 8, wherein the smart-home application further causes the mobile device to:
receive, via a touchscreen of the mobile device, user input via the custom interface controller.

10. The system for using the captured voice to generate the custom interface controller of claim 9, wherein the smart-home application further causes the mobile device to:
determine a command to be performed by each of the plurality of smart-home devices based on the user input received via the custom interface controller; and
transmit the command and the plurality of smart-home device identifiers to the cloud-based host server system.

11. The system for using the captured voice to generate the custom interface controller of claim 10, wherein the smart-home application further causes the mobile device to:
transmit, to a cloud-based server system, an indication of the command and a smart-home device identifier of the plurality of smart-home device identifiers in response to receiving the command and the plurality of smart-home device identifiers from the smart-home application executed by the mobile device, wherein the cloud-based server system communicates with a second smart-home device mapped to the smart-home device identifier.

12. The system for using the captured voice to generate the custom interface controller of claim 11, wherein the smart-home application further causes the mobile device to:
transmit, a second indication of the command to a second smart-home device mapped to a second smart-home device identifier of the plurality of smart-home device identifiers in response to receiving the command and the plurality of smart-home device identifiers from the smart-home application executed by the mobile device.

13. The system for using the captured voice to generate the custom interface controller of claim 8, wherein the custom interface controller comprises a first control to control a first function of the plurality of smart-home devices and a second control to control a second function of the plurality of smart-home devices.

14. The system for using the captured voice to generate the custom interface controller of claim 8, further comprising the cloud-based host server system, wherein:
the vocal recording additionally indicates a location and a type of smart-home device; and
the cloud-based host server system causes the spoken command to be performed at the plurality of smart-home devices based on the plurality of smart-home devices matching the location and the type of smart-home device indicated in the vocal recording.

15. The system for using the captured voice to generate the custom interface controller of claim 8, further comprising the cloud-based host server system that is configured to analyze the vocal recording to determine the spoken command and the plurality of smart-home devices.

16. A system for using captured voice to generate a custom interface controller, the system comprising:
a cloud-based host server system that performs natural language processing;
a mobile device, wherein one or more processors of the cloud-based host server system and the mobile device are configured to:
capture, via one or more microphones, a vocal recording from a user, wherein the vocal recording comprises a spoken command directed to a plurality of smart-home devices;
transmit the vocal recording to the cloud-based host server system to perform the natural language processing on the spoken command;
receive a response from the cloud-based host server system that comprises a plurality of smart-home device identifiers, wherein:
the plurality of smart-home device identifiers were identified by the cloud-based host server system based on the natural language processing performed on the spoken command; and
the plurality of smart-home device identifiers correspond to multiple different types of smart-home devices;
determine two or more common functions of the plurality of smart-home devices based on the plurality of smart-home device identifiers that were received in the response from the cloud-based host server system based on the natural language processing performed on the spoken command; and
generate two or more control elements, which are presented as part of a single custom interface controller, for presentation by a display of the mobile device, wherein the two or more control elements the two or more common functions of each smart-home device of the plurality of smart-home devices or which smart-home device identifiers were received from the cloud-based host server system, wherein:
each control element of the two or more control elements is mapped to a common function of the two or more common functions.

17. The system for using the captured voice to generate the custom interface controller of claim 16, wherein the one or more processors are further configured to:
receive user input via the custom interface controller;
determine a command to be performed by each of the plurality of smart-home devices based on the user input received via the custom interface controller; and
based on the command, cause an indication of the command and a smart-home device identifier to be transmitted to a second cloud-based host server system distinct from the cloud-based host server system, wherein the second cloud-based host server system communicates with a second smart-home device mapped to the smart-home device identifier.

* * * * *